United States Patent
Nakamura

(10) Patent No.: US 9,542,733 B2
(45) Date of Patent: Jan. 10, 2017

(54) IMAGE PROCESSING METHOD, IMAGING PROCESSING APPARATUS AND IMAGE PROCESSING PROGRAM FOR CORRECTING DENSITY VALUES BETWEEN AT LEAST TWO IMAGES

(71) Applicant: KONICA MINOLTA, INC., Tokyo (JP)

(72) Inventor: Mitsunori Nakamura, Tama (JP)

(73) Assignee: KONICA MINOLTA, INC., Tokyo (JP)

( * ) Notice: Subject to any disclaimer, the term of this patent is extended or adjusted under 35 U.S.C. 154(b) by 53 days.

(21) Appl. No.: 14/370,944

(22) PCT Filed: Dec. 11, 2012

(86) PCT No.: PCT/JP2012/082016
§ 371 (c)(1),
(2) Date: Jul. 7, 2014

(87) PCT Pub. No.: WO2013/105381
PCT Pub. Date: Jul. 18, 2013

(65) Prior Publication Data
US 2015/0043817 A1    Feb. 12, 2015

(30) Foreign Application Priority Data

Jan. 10, 2012  (JP) ................. 2012-002417

(51) Int. Cl.
*G06K 9/00* (2006.01)
*G06T 5/40* (2006.01)
(Continued)

(52) U.S. Cl.
CPC ............... *G06T 5/40* (2013.01); *G06T 5/007* (2013.01); *G06T 7/403* (2013.01); *G06T 2207/10012* (2013.01); *H04N 1/4074* (2013.01)

(58) Field of Classification Search
None
See application file for complete search history.

(56) References Cited

U.S. PATENT DOCUMENTS

| 2005/0102107 A1 | 5/2005 | Porikli |
| 2006/0164523 A1 | 7/2006 | Jiang et al. |

(Continued)

FOREIGN PATENT DOCUMENTS

| EP | 2 320 378 A1 | 5/2011 |
| JP | 2004-343483 A | 12/2004 |

(Continued)

OTHER PUBLICATIONS

Atif Ilyas; "Object Tracking and Re-Identification in Multi-Camera Environments, Camera Color Calibration"; Jun. 17, 2011; Doctoral Thesis Universite Lumiere Lyon 2. pp. 77-94.*

(Continued)

*Primary Examiner* — Eueng-Nan Yeh
(74) *Attorney, Agent, or Firm* — Brinks Gilson & Lione

(57) ABSTRACT

An image processing method includes: a generating step of generating a cumulative histogram of density values of pixels included in at least each of a first image and a second image; a calculating step of calculating a distance between a density value on a first histogram generated from the first image and a density value on a second histogram generated from the second image, in a space defined to include histogram frequencies of the cumulative histograms and the density values; and a determining step of determining a correspondence relation between the density values included in the first image and the density values included in the second image based on the calculated distances between the density values, and determining a conversion function for (Continued)

correcting a density value between the first image and the second image based on the determined correspondence relation.

8 Claims, 30 Drawing Sheets

(51) Int. Cl.
    *G06T 5/00*     (2006.01)
    *G06T 7/40*     (2006.01)
    *H04N 1/407*     (2006.01)

(56) References Cited

U.S. PATENT DOCUMENTS

| | | |
|---|---|---|
| 2008/0089581 A1 | 4/2008 | Pitie et al. |
| 2009/0052776 A1 | 2/2009 | Panahpour Tehrani et al. |
| 2009/0268964 A1* | 10/2009 | Takahashi ............... G06K 9/38 382/170 |

FOREIGN PATENT DOCUMENTS

| | | |
|---|---|---|
| JP | 2008-524673 A | 7/2008 |
| JP | 2009-49759 A | 3/2009 |
| JP | 2010-16803 A | 1/2010 |
| JP | 2011-95131 A | 5/2011 |

OTHER PUBLICATIONS

Bernas et al.; "Quadratic Form: A robust metric for quantitative comparison of flow cytometric histograms"; Cytometry Part A: journal of the international society for analytical cytology' vol. 73A; Jun. 16, 2008; pp. 715-726.*
Elgammal; "Digital Imaging and Multimedia Point Operations in Digital Images"; Dept. of Computer Science, Rutgers Uniiversity (http://www.cs.rutgers.edu/~elgammal/classes/cs334/PointOperation.pdf); Jan. 2016; pp. 1-16.*
International Search Report in International Application No. PCT/JP2012/082016 dated Feb. 26, 2013, 2 pages.
"Color calibration of cameras based on the histogram translation," Shigemura, Shinya, and Taguchi, Akira, The Institute of Electronics, Information and Communication Engineers Technical Report SIS2007-60, with English language translation of the Abstract, dated Dec. 2007, pp. 13-18.
Supplementary Partial European Search Report issued in European Patent Application No. 12 86 4866 dated Sep. 7, 2015.
Office Action regarding Japanese patent application 2013-553216, mailed on Jun. 14, 2016, 5 pages, including English language translation, 6 pages.
Elgammal, Ahmed, "CS443: Digital Imaging and Multimedia Point Operations in Digital Images," available at http://www.cs.rutgers.edu/elgammal/classes/cs443/PointOperation.pdf as of Jan. 27, 2016, pp. 1-16.
Bernas, Tytus, et al., "Quadratic Form: A Robust Metric of Quantitative Comparison of Flow Cytometric Histograms," Cytometry Part A, vol. 73A, 2008, pp. 715-726. (published Jun. 16, 2008).

* cited by examiner

FIG.4
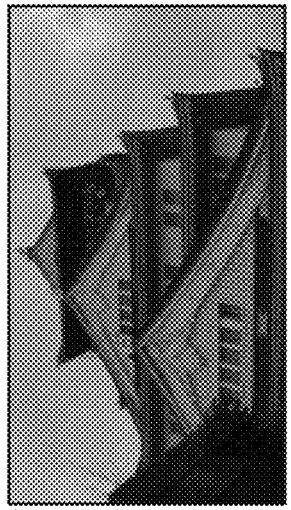
IMAGE 1
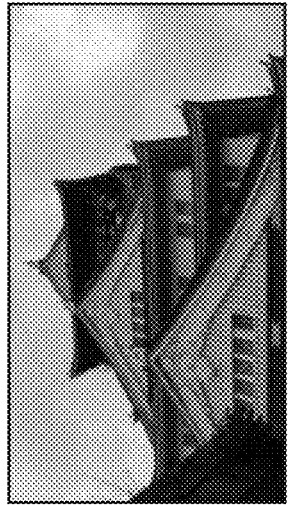
IMAGE 2

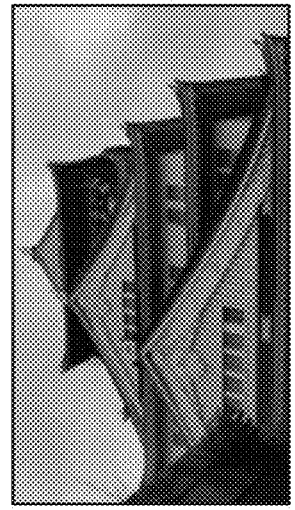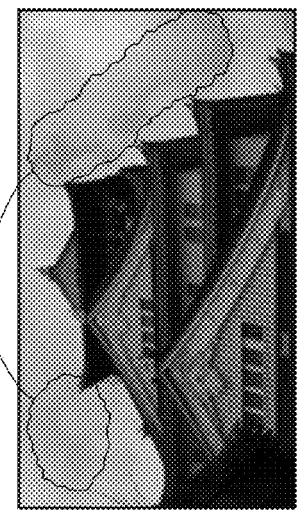
FIG.8 FALSE TEXTURE

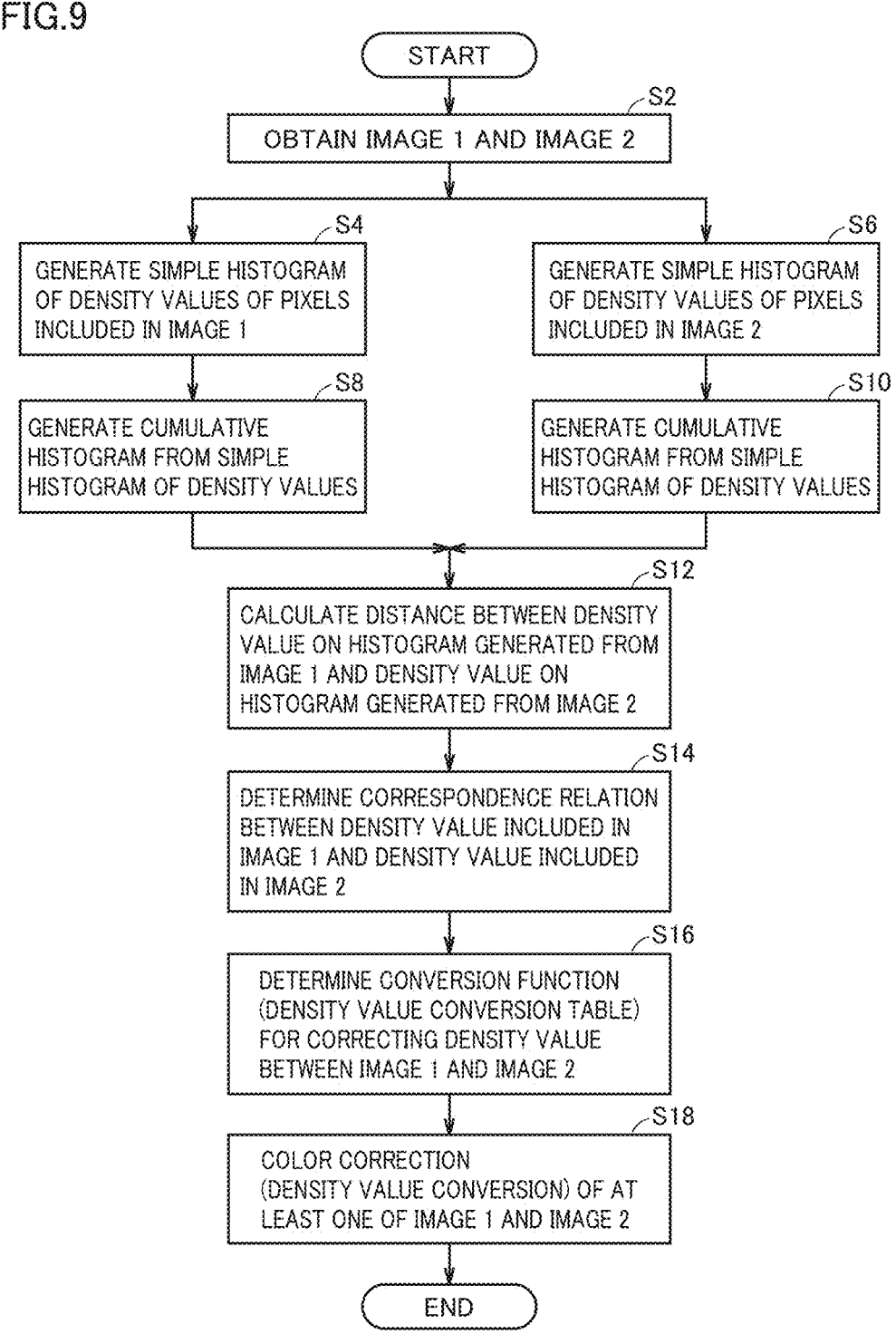

FIG.15

| DENSITY VALUE (B) OF IMAGE 1 | DENSITY VALUE (B) OF IMAGE 2 |
|---|---|

| DENSITY VALUE (G) OF IMAGE 1 | DENSITY VALUE (G) OF IMAGE 2 |
|---|---|

| DENSITY VALUE (R) OF IMAGE 1 | DENSITY VALUE (R) OF IMAGE 2 |
|---|---|
| 0 | 0 |
| 1 | 2 |
| 2 | 3 |
| 3 | 3 |
| 4 | 4 |
| 5 | 6 |
| ... | ... |
| 253 | 254 |
| 254 | 254 |
| 255 | 255 |

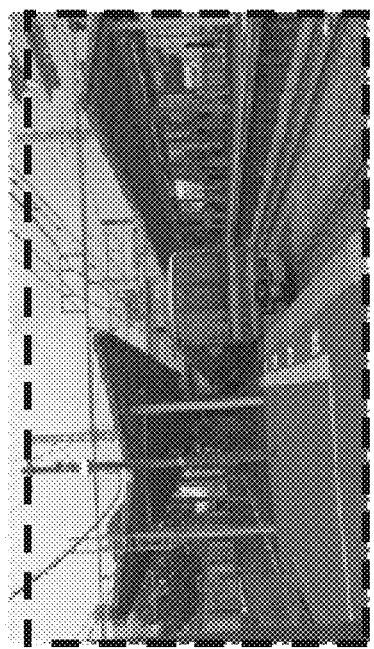
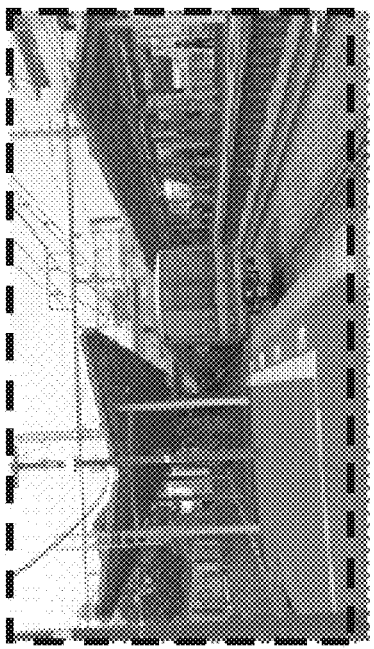
FIG. 29

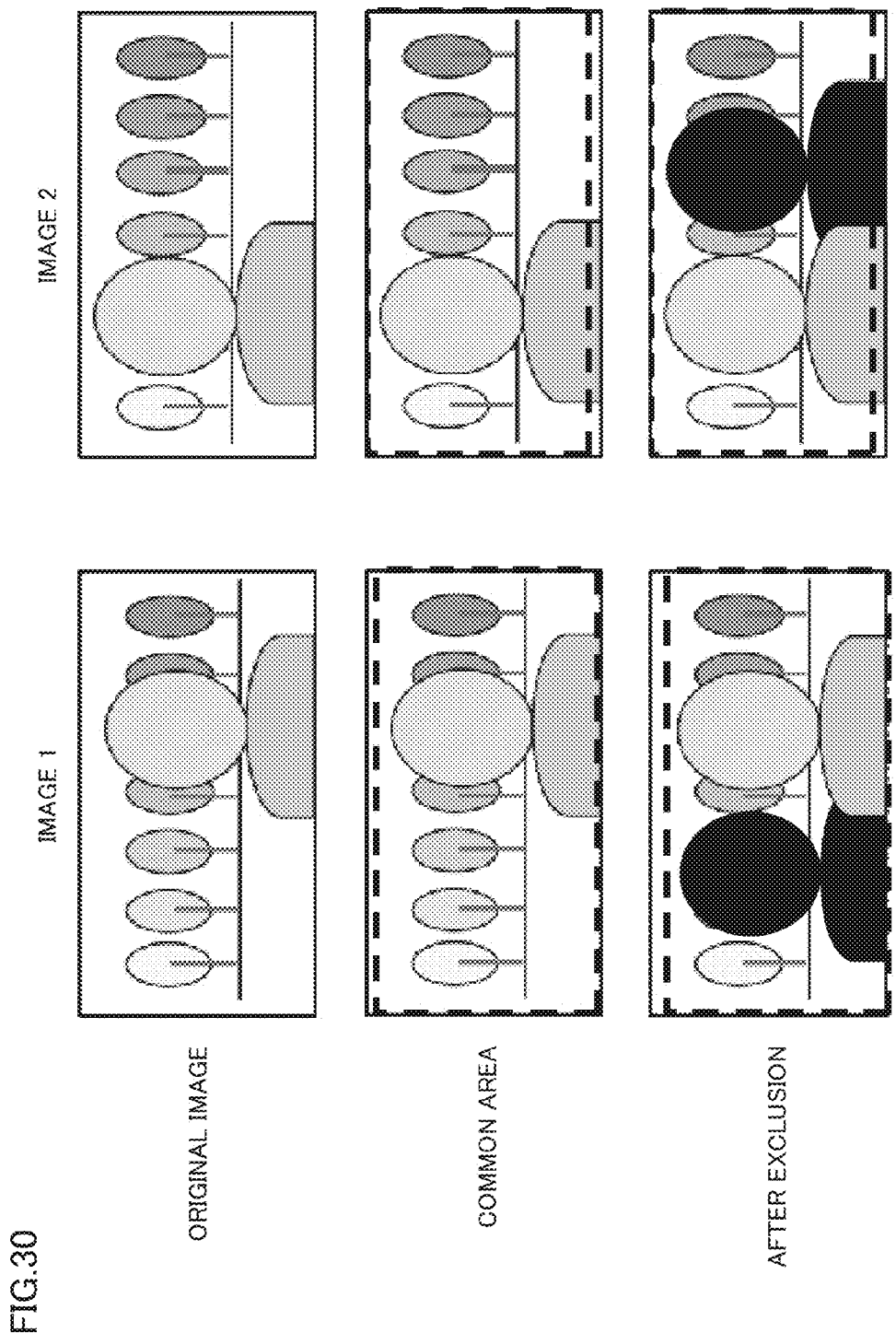

IMAGE PROCESSING METHOD, IMAGING PROCESSING APPARATUS AND IMAGE PROCESSING PROGRAM FOR CORRECTING DENSITY VALUES BETWEEN AT LEAST TWO IMAGES

This application is a National Stage application of International Application No. PCT/JP2012/082016, filed Dec. 11, 2012.

TECHNICAL FIELD

The present invention relates to an image processing method, an image processing apparatus and an image processing program, in which a conversion function for correcting a density value between at least two images is generated.

BACKGROUND

The technique of stereoscopically displaying a subject by using images of the same subject captured from a plurality of points of view has been conventionally developed. In such a case, a density value corresponding to the same portion of the subject may vary from image to image, depending on a difference in conditions at the time of capturing the images, and the like. Therefore, processing is executed to correct a density value of pixels included in one image with respect to a density value of pixels included in the other image. Various conversion functions such as a density value conversion table is used for this correction processing.

The following is known as the prior art related to the aforementioned correction processing.

For example, in a color adjusting apparatus disclosed in Japanese Laid-Open Patent Publication No. 2010-16803 (PTD 1), a captured image represented by an RGB color space of one camera A of two cameras A and B is defined as a reference image Sa, and a captured image represented by an RGB color space of the other camera B is defined as an image to be adjusted Sb. Color space conversion is applied to image to be adjusted Sb by a color adjusting unit in the color adjusting apparatus, and cumulative histogram matching processing is applied with respect to a component Ha(k) of reference image Sa, for each component after this color space conversion. After this cumulative histogram matching processing, the original RGB space is recovered. An adjusted image Sb' having the same color tone as that of reference image Sa is thus generated.

According to a method disclosed in "Color Calibration between Two Different Cameras", Shintaro Inamura, Akira Taguchi (NPD 1), images of the same subject are captured by two cameras arranged side by side, and conversion is made to match a histogram of the image captured by one camera to a histogram of the image captured by the other camera such that cumulative histograms of the obtained two images match with each other. Then, color space conversion is applied, and thereafter, histogram conversion is applied for each component. Thereafter, an RGB color space is recovered by reverse conversion.

CITATION LIST

Patent Document

PTD 1: Japanese Laid-Open Patent Publication No. 2010-16803

NON PATENT DOCUMENT

NPD 1: "Color Calibration between Two Different Cameras", Shintaro Inamura, Akira Taguchi, the Institute of Electronics, Information and Communication Engineers, IEICE Technical Report, Vol. 107, No. 374 (SIS200758-67), pp. 13-18, Dec. 4, 2007

BRIEF SUMMARY

Technical Problem

However, the representations of the subject are not precisely identical among the images of the same subject captured from different points of view because the images of the subject are captured at different angles. For example, in the case of a stereo camera capable of generating stereoscopic images, a representation of a subject seen on an image for right eye is different from a representation of the subject seen on an image for left eye, and thus, shapes of histograms generated from the respective images are not identical. Therefore, by the method using only the histograms as disclosed in the aforementioned prior art, a color correspondence relation between the images cannot be appropriately determined in some cases. As a result, a portion of sharp change in correspondence relation may be generated in the conversion function such as the density value conversion table. In this case, discontinuity may occur in the density value (tone) included in the corrected image, and a false texture or the like may be generated.

The present invention has been made to solve the aforementioned problem, and an object thereof is to provide an image processing method, an image processing apparatus and an image processing program, in which a conversion function for correcting a density value can be generated more appropriately even when representations of a subject are different among a plurality of images.

Solution to Problem

An image processing method according to one aspect of the present invention includes: a generating step of generating a cumulative histogram of density values of pixels included in at least each of a first image and a second image; a calculating step of calculating a distance between a density value on a first histogram generated from the first image and a density value on a second histogram generated from the second image, in a space defined to include histogram frequencies of the cumulative histograms and the density values; and a determining step of determining a correspondence relation between the density values included in the first image and the density values included in the second image based on the calculated distances between the density values, and determining a conversion function for correcting a density value between the first image and the second image based on the determined correspondence relation.

Advantageous Effects of Invention

According to the present invention, a conversion function for correcting a density value can be generated more appropriately even when representations of a subject are different among a plurality of images.

BRIEF DESCRIPTION OF THE DRAWINGS

FIG. 4 is a diagram showing an example of images subjected to the process for generating a conversion function for correcting a density value.

FIG. 8 is a diagram showing one example of a result of density value correction using the density value conversion table shown in FIG. 7.

FIG. 9 is a flowchart showing an overall procedure of the conversion function generating process according to the embodiment of the present invention.

FIG. 15 is a diagram showing one example of a density value conversion table 22 generated by the conversion function generating process according to the embodiment of the present invention.

FIG. 29 is a diagram showing one example of the common area set by using pattern matching in the seventh embodiment of the present invention.

FIG. 30 is a diagram for describing a process for excluding an occlusion area according to the seventh embodiment of the present invention.

DETAILED DESCRIPTION OF THE DRAWINGS AND THE PRESENTLY PREFERRED EMBODIMENTS

Figure 1:
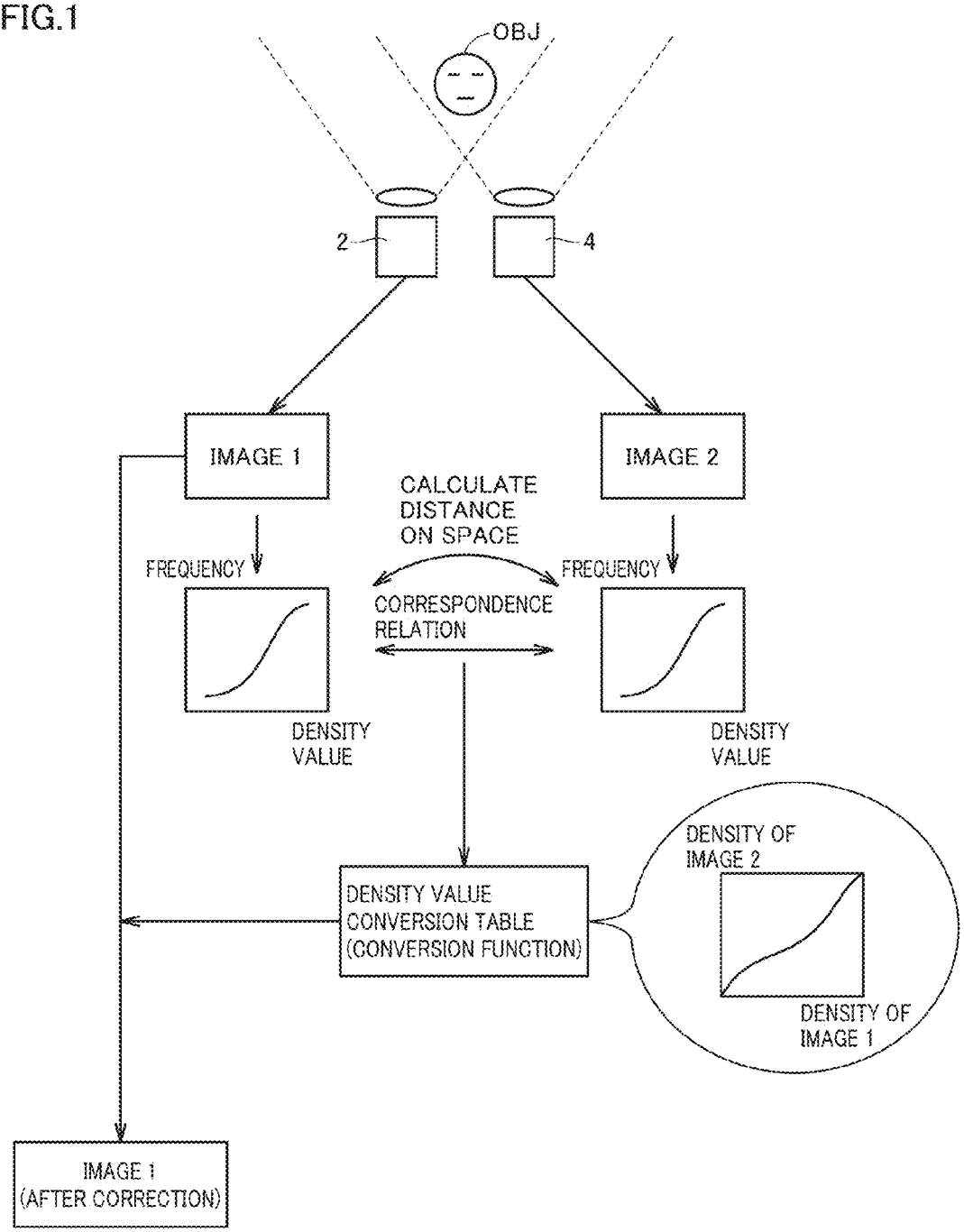
FIG. 1 is a diagram for describing an overview of conversion function generating process according to an embodiment of the present invention.

Embodiments of the present invention will be described in detail with reference to the drawings, in which the same reference characters are assigned to the same or corresponding portions and description thereof will not be repeated.

A. Overview

An embodiment of the present invention is directed to an image processing method in which a conversion function for correcting a density value at least between a first image and a second image is determined. These images refer to images captured from the same subject and may be three or more images. A plurality of these images are typically obtained by using a plurality of imaging devices (cameras) to capture images of the same subject from different points of view. More specifically, the respective images are obtained by using the plurality of cameras (typically, stereo cameras) spaced apart from one another by a prescribed distance to capture images of the same subject.

"Image" in the present embodiment may include both an image having each pixel defined by a density value of a single channel (i.e., monochromatic image), and an image having each pixel defined by means of density values of a plurality of channels (i.e., color image). In the case of the monochromatic image, a density value corresponding to a gradation value or a tone value is used as the aforementioned channel. In the case of the color image, tone values of an RGB color space, a CMY color space and the like are used as the density values of the respective channels. Furthermore, the image processing method is also applicable to an image expressed by using various color spaces such as a YUV color space, a XYZ color space, a xyY color space, an L*u*v* color space, and an L*a*b* color space.

Although the image processing method according to the present embodiment is typically directed to a process for generating a conversion function for correcting a density value between stereoscopically-captured images, the image processing method according to the present embodiment is not limited thereto. The image processing method according to the present embodiment is also applicable to density value correction (color matching) between panoramic images, and the like.

FIG. 1 is a diagram for describing an overview of a conversion function generating process according to the embodiment of the present invention. Referring to FIG. 1, images of a subject OBJ are captured by using stereo cameras (cameras 2 and 4), to obtain a pair of images (image 1 and image 2). The following processing is executed on image 1 and image 2 to determine a conversion function for correcting a density value between the images.

First, a cumulative histogram of density values of pixels included in each of image 1 and image 2 is generated. Then, a distance between a density value on a first cumulative histogram generated from image 1 and a density value on a second cumulative histogram generated from image 2 is sequentially calculated, in a space defined to include histogram frequencies of the cumulative histogram and the density value. Furthermore, a correspondence relation between the density value included in image 1 and the density value included in image 2 is determined based on the calculated distance between the density values, and a conversion function for correcting the density value between image 1 and image 2 is determined based on the determined correspondence relation. In the present embodiment, a density value conversion table is used as a typical example of the conversion function. However, the conversion function does not necessarily need to be a table-type conversion function, but may be a function-type or mapping-type conversion function.

In the present embodiment, when the correspondence relation between the first cumulative histogram of image 1 and the second cumulative histogram of image 2 is determined, the density value conversion table is not generated by associating the histograms of the same histogram frequencies. The density value conversion table is determined based on the correspondence relation between the density values obtained from a result of searching for a relation between corresponding density values (typically by using a DP (Dynamic Programming) matching method and the like) based on the distance in the space defined to include the histogram frequencies of the cumulative histograms and the density values.

As a result, even when the representations of the subject are different between the images, the density value conversion table with no sharp change in tone can be generated.

The conversion function generating process according to the present embodiment will be described in more detail hereinafter.

B. System Configuration

First, description will be given to an example manner of implementing an image processing apparatus that implements the conversion function generating process according to the embodiment of the present invention.

[b1: Implementation by Personal Computer]

Figure 2:
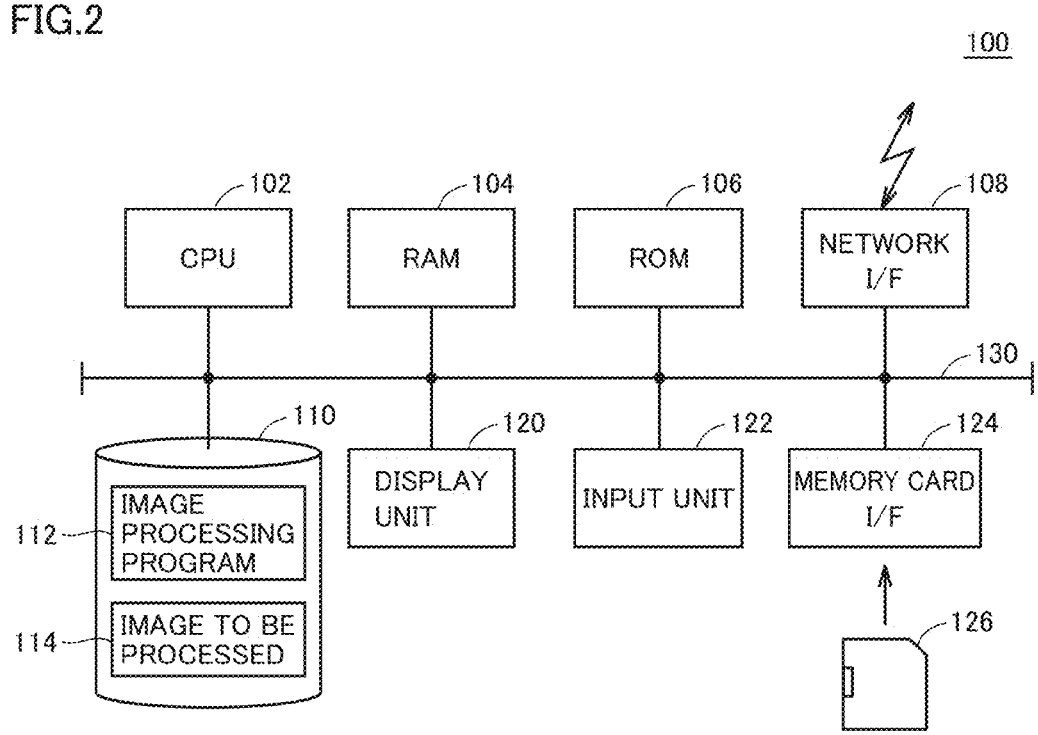
FIG. 2 is a block diagram showing a configuration when the conversion function generating process according to the embodiment of the present invention is implemented by a personal computer.

FIG. 2 is a block diagram showing a configuration when the conversion function generating process according to the embodiment of the present invention is implemented by a personal computer.

Referring to FIG. 2, an image processing apparatus 100 implemented by a personal computer is mainly implemented on a computer having a general-purpose architecture. Referring to FIG. 2, image processing apparatus 100 includes, as main components, a CPU (Central Processing Unit) 102, a RAM (Random Access Memory) 104, a ROM (Read Only Memory) 106, a network interface (I/F) 108, an auxiliary storage device 110, a display unit 120, an input unit 122, and a memory card interface (I/F) 124. The components are connected by a bus 130 to be capable of communicating with one another.

CPU 102 executes various programs such as an operating system (OS) and a conversion function generating process program stored in ROM 106, auxiliary storage device 110 and the like, thereby controlling the whole of image processing apparatus 100. RAM 104 functions as a working memory for executing the programs in CPU 102, and primarily stores various data required for execution of the programs. ROM 106 stores an initial program (boot program) and the like executed in image processing apparatus 100 at the time of startup.

Network interface 108 exchanges data with other devices (such as a server device) via various communication media. More specifically, network interface 108 carries out data communication via a wired line such as Ethernet (registered trademark) (such as LAN (Local Area Network) and WAN (Wide Area Network)) and/or a wireless line such as wireless LAN.

Auxiliary storage device 110 is typically formed of a high-capacity magnetic storage medium or the like such as a hard disk, and stores an image processing program 112 for implementing various processes according to the present embodiment, an image to be processed 114, and the like. Furthermore, a program such as the operating system may be stored in auxiliary storage device 110.

Image to be processed 114 includes at least two images to be processed. However, image processing apparatus 100 itself does not necessarily need to have a function of capturing images of a subject. In this case, at least two images may be obtained by using a below-described mechanism similar to a digital camera, and these images may be input to image processing apparatus 100 in accordance with an arbitrary method. More specifically, the images are input to image processing apparatus 100 via network interface 108 or memory card interface 124 described above.

Display unit 120 displays a GUI (Graphical User Interface) screen provided by the operating system, an image generated by execution of image processing program 112, and the like. When image processing apparatus 100 deals with a stereoscopic image, display unit 120 is preferably configured by an arbitrary display device that is compliant with a three-dimensional display scheme. A parallax barrier scheme and the like can be used as the aforementioned three-dimensional display scheme. According to this parallax barrier scheme, a parallax barrier is provided on a liquid crystal display surface, such that a user can see an image for right eye with his/her right eye and can see an image for left eye with his/her left eye. Alternatively, a shutter glasses scheme may be used. According to this shutter glasses scheme, an image for left eye and an image for right eye are alternately switched at high speed and displayed. The user wears dedicated glasses on which a shutter opened and closed in synchronization with this switching of the images is implemented, and can enjoy stereoscopic display.

Input unit 122 is typically formed of a keyboard, a mouse, a touch panel and the like, and outputs, to CPU 102 and the like, an instruction received from the user.

Memory card interface 124 reads and writes data from/to various memory cards (nonvolatile storage media) 126 such as an SD (Secure Digital) card and a CF (Compact Flash (registered trademark)) card. Typically, memory card interface 124 has mounted thereon a memory card 126 that stores an image to be processed which was obtained in some kind of device, and the image to be processed which was read from this memory card 126 is stored (copied) in auxiliary storage device 110.

Image processing program 112 stored in auxiliary storage device 110 is stored in a storage medium such as a CD-ROM (Compact Disk-Read Only Memory) and distributed, or is distributed from the server device and the like through a network. Image processing program 112 may be implemented by invoking necessary modules at prescribed timing and order, of program modules provided as a part of the operating system executed in image processing apparatus 100 (personal computer). In this case, image processing program 112 itself does not include the modules provided by the operating system, and implements image processing in cooperation with the operating system. Alternatively, image processing program 112 may not be an independent single program but may be incorporated into and provided as a part of any given program. In this case as well, image processing program 112 itself does not include the modules shared by the given program, and implements image processing in cooperation with the given program. Such image processing program 112 that does not include some modules does not depart from the spirit of image processing apparatus 100 according to the present embodiment.

Furthermore, a part or all of the functions provided by image processing program 112 may be implemented by dedicated hardware.

[b2: Implementation by Configuration Similar to Digital Camera]

Figure 3:
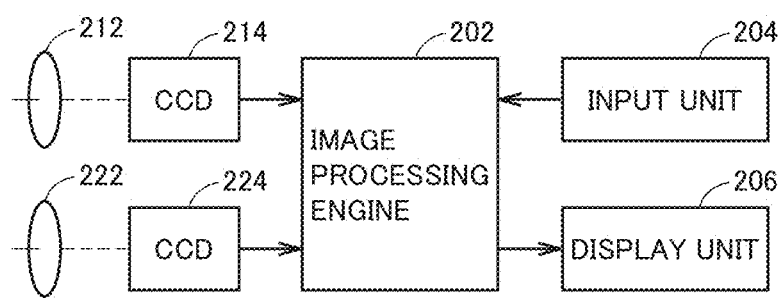
FIG. 3 is a block diagram showing a configuration when the conversion function generating process according to the embodiment of the present invention is implemented by a configuration similar to a digital camera.

FIG. 3 is a block diagram showing a configuration when the conversion function generating process according to the embodiment of the present invention is implemented by a configuration similar to a digital camera.

Referring to FIG. 3, in an image processing apparatus 200, images of a subject are actually captured to obtain at least two images to be processed, and the conversion function generating process is executed on these obtained images to be processed. Image processing apparatus 200 includes, as main components, an image processing engine 202, an input unit 204, a display unit 206, a pair of lenses 212 and 222, and a pair of CCD (Charge Coupled Device) image sensors 214 and 224.

Image processing engine 202 executes various types of digital processing including the conversion function generating process according to the present embodiment. Image processing engine 202 is typically formed of DSP (Digital Signal Processor), ASIC (Application Specific Integrated Circuit), LSI (Large Scale Integration), FPGA (Field-Programmable Gate Array) and the like.

Input unit 204 is typically formed of various key buttons, a touch panel and the like, and outputs, to image processing engine 202, an instruction received from the user.

Display unit 206 displays a user interface screen about capturing images of a subject and the like. When image processing apparatus 200 deals with a stereoscopic image, display unit 206 is preferably configured by an arbitrary display device that is compliant with a three-dimensional display scheme, similarly to display unit 120 (FIG. 2) described above.

The pair of lenses 212 and 222 are provided at a position different from that of the main body of image processing apparatus 200, and can capture images of the subject from different points of view. Namely, the different reflected lights from the subject enter the pair of lenses 212 and 222. The pair of CCDs 214 and 224 are associated with the pair of lenses 212 and 222, respectively. The pair of CCDs 214 and 224 receive light (image) from the subject focused by lenses 212 and 222, and output an electric signal indicating the image to image processing engine 202.

[b3: Implementation by Other Configuration]

In addition to the implementation by the personal computer and the implementation by the configuration similar to the digital camera as described above, the conversion function generating process according to the embodiment of the present invention may be implemented on a mobile phone. Furthermore, a configuration like a so-called cloud service may be used in which at least one server device implements processing according to the present embodiment. In this case, such a configuration is assumed that the user uses his/her terminal (such as a personal computer and a smart phone) to send at least two images to be processed to the server device (cloud side) and the server device executes image processing according to the present embodiment on the sent images to be processed. Furthermore, the server device does not need to execute all functions (processing) and the terminal on the user side and the server device may cooperate to implement image processing according to the present embodiment.

C. Related Art

Before describing the conversion function generating process according to the present embodiment, the related art will be described first.

Figure 5:
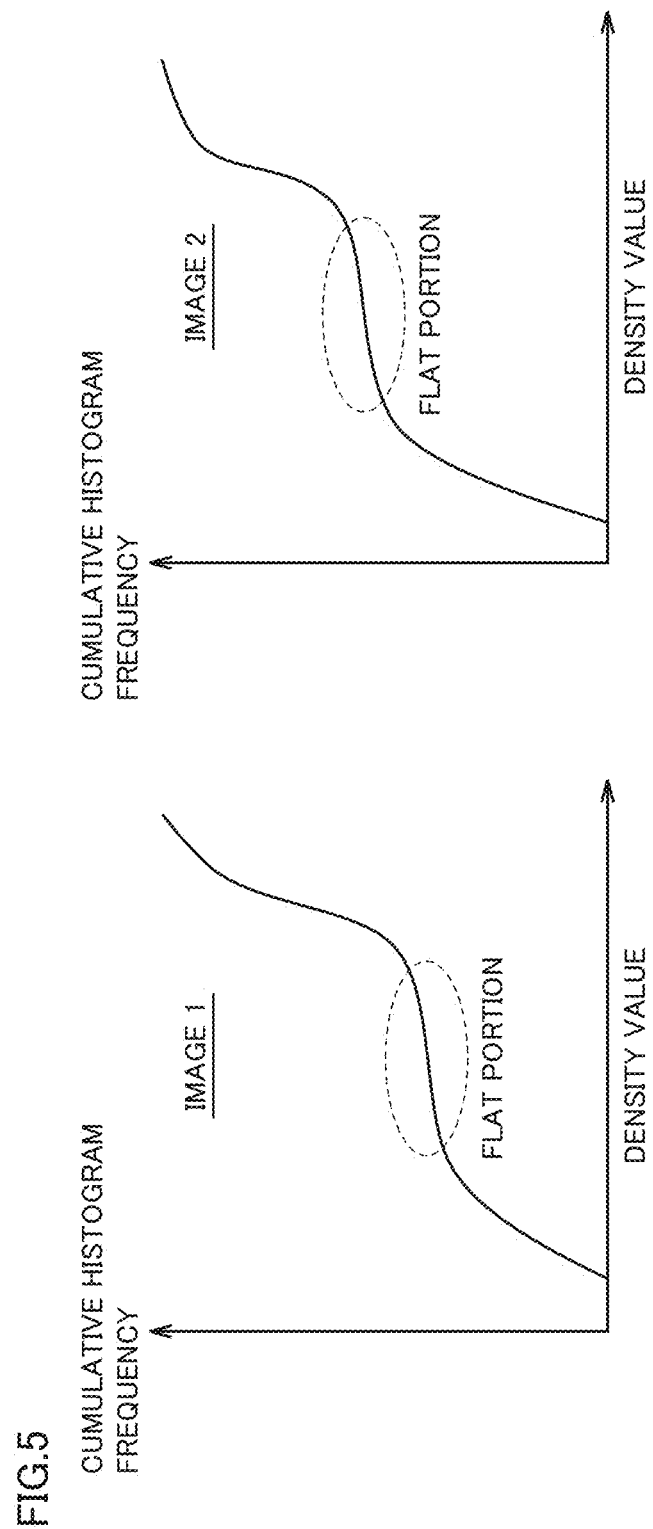
FIG. 5 is a diagram showing one example of a cumulative histogram generated from each image shown in FIG. 4.
Figure 6:
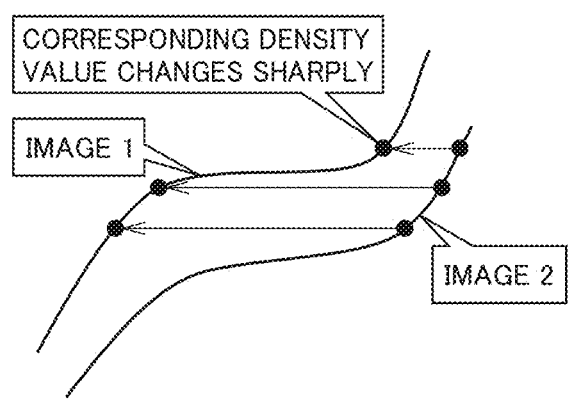
FIG. 6 is a diagram for describing the case in which density value association is not appropriately performed.
Figure 7:
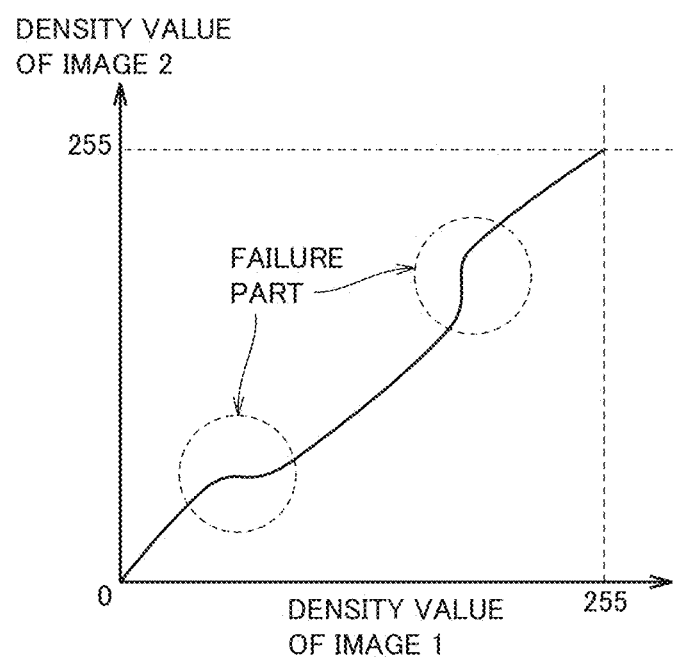
FIG. 7 is a diagram showing one example of a density value conversion table generated when the situation shown in FIG. 6 occurs.

FIG. 4 is a diagram showing an example of images subjected to the process for generating a conversion function for correcting a density value. FIG. 5 is a diagram showing one example of a cumulative histogram generated from each image shown in FIG. 4. FIG. 6 is a diagram for describing the case in which density value association is not appropriately performed. FIG. 7 is a diagram showing one example of a density value conversion table generated when the situation shown in FIG. 6 occurs. FIG. 8 is a diagram showing one example of a result of density value correction using the density value conversion table shown in FIG. 7.

According to the technique disclosed in NPD 1 described above, in density value correction (color correction) between the images, a correspondence relation between density values is determined based only on a histogram frequency, between the cumulative histograms generated from the respective images.

For example, the case of making density value correction to the two images shown in FIG. 4 is assumed. The two images (image 1 and image 2) shown in FIG. 4 are different in overall density (brightness). The case of correcting such a difference in density value is assumed. When attention is focused on a density value (in this example, a tone value of one channel) of pixels included in each of image 1 and image 2 shown in FIG. 4, each histogram shown in FIG. 5 is generated. Although FIG. 5 shows the cumulative histogram, a simple histogram may be generated.

The density values are associated between these histograms, based only on the histogram frequency. More specifically, when attention is focused on a certain density value of image 1, a density value of image 2 having a histogram frequency closest to a cumulative histogram frequency of this density value is determined as a corresponding density value. Namely, as shown in FIG. 6, coordinates having the same histogram frequency are associated with each other.

The aforementioned related art is based on the premise that the representation of the subject seen on image 1 is substantially the same as the representation of the subject seen on image 2, i.e., the shapes of the histograms of both images are substantially the same. Namely, the related art is based on the premise that the density shifts as a whole due to the different cameras. In reality, however, in the case of the stereo cameras, for example, a parallax is present between the cameras, and thus, the representations of the subject are not identical between the generated two images, and as a result, the shapes of the histograms are also different. In such a case, there is a possibility that a correct correspondence relation cannot be obtained.

In each image shown in FIG. 4, for example, a percentage of medium-level density value is relatively small. Therefore, in each cumulative histogram shown in FIG. 5, there is a flat portion in which the histogram frequency does not increase so much even when the density value increases. According to the aforementioned related art, as for the image showing the histogram with such a flat portion, the correspondence relation between the density values (color after conversion) cannot be appropriately determined. Namely, as shown in FIG. 6, the density value having the same cumulative histogram frequency is greatly different between image 1 and image 2. Therefore, when the density value of one image is converted into the density value of the other image, the density value changes greatly. As described above, as for the image having the cumulative histogram shown in FIG. 6, the color after conversion cannot be appropriately determined.

As a result, as shown in FIG. 7, a portion of sharp change in correspondence relation is generated (a discontinuity occurs) in the generated conversion function (density value conversion table). Namely, this portion refers to a part in which association between the density values has failed.

When color correction is made by using the density value conversion table shown in FIG. 7, a tone discontinuity may occur in the pixels included in the image, and a false texture or the like shown in FIG. 8 may be generated.

In view of the aforementioned problem, in the conversion function generating process according to the present embodiment, a distance (proximity) between the density values is defined by using not only the histogram frequencies but also the density values of the pixels. Then, based on the proximity between the density values of the respective images, the corresponding density values are searched by using the method such as DP matching, thereby determining the correspondence relation between the density values.

D. Overall Process

First, an overall procedure of the image processing method according to the present embodiment will be described.

FIG. 9 is a flowchart showing an overall procedure of the conversion function generating process according to the embodiment of the present invention. Each step shown in FIG. 9 is typically implemented by CPU 102 (FIG. 2) executing image processing program 112.

Referring to FIG. 9, CPU 102 first obtains at least two images. In the example shown in FIG. 9, an example of a process when color correction is made between the two images will be described. Namely, CPU 102 obtains image 1 and image 2 (step S2). Typically, a pair of stereo images obtained by capturing images of a subject with the pair of stereo cameras and the like are input.

Next, CPU 102 generates a cumulative histogram of density values of pixels included in each image. Namely, CPU 102 generates a simple histogram of density values of pixels included in input image 1 (step S4), and generates a simple histogram of density values of pixels included in input image 2 (step S6). The processing in steps S4 and S6 may be implemented by parallel processing or serial processing. When the processing in steps S4 and S6 is implemented by serial processing, the order of execution does not matter. Next, CPU 102 generates a cumulative histogram from the simple histogram of the density values generated in step S4 (step S8), and generates a cumulative histogram from the simple histogram of the density values generated in step S6 (step S10).

Next, CPU 102 calculates a distance between the density value on the histogram generated from image 1 and the density value on the histogram generated from image 2, in a space defined to include histogram frequencies of the cumulative histograms and the density values (step S12). As described below, for all possible combinations of the density values on the respective histograms, the distances between the density values are typically calculated in a coordinate system defined by the density value and the cumulative histogram frequency.

Next, CPU 102 determines a correspondence relation between the density value included in image 1 and the density value included in image 2, based on the distance between the density values calculated in step S12 (step S14). Then, CPU 102 determines a conversion function (density value conversion table 22) for correcting the density value between image 1 and image 2, based on the determined correspondence relation (step S16).

As a result of the aforementioned processing, the conversion function (density value conversion table 22) required for color correction between image 1 and image 2 is determined. As needed, CPU 102 also makes color correction to image 1 and/or image 2. Namely, CPU 102 makes color correction (density value conversion) to at least one of image 1 and image 2, based on the conversion function (density value conversion table 22) determined in step S16 (step S18). As a result of step S18, color-corrected two images are generated. Then, the process ends.

In principle, the conversion function (density value conversion table 22) determined in step S16 is applicable to a set of images captured under the same imaging conditions, and thus, the processing in step S18 may be repeated the same number of times as the number of a set of image 1 and image 2.

E. Functional Configuration

Next, a functional configuration of the image processing apparatus and/or an image processing program according to the present embodiment will be described.

Figure 10:
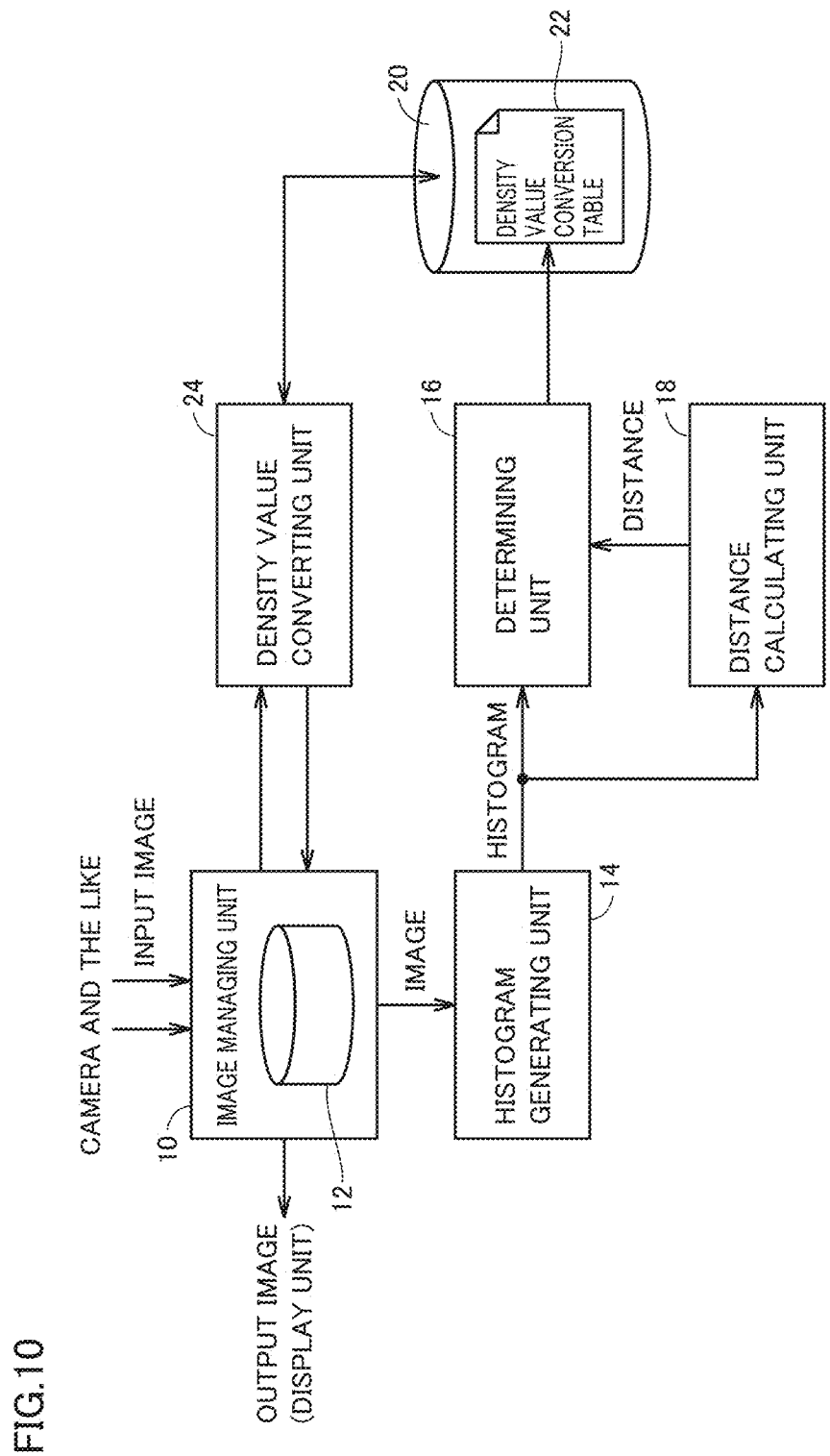
FIG. 10 is a block diagram showing a functional configuration of the conversion function generating process according to the embodiment of the present invention.

FIG. 10 is a block diagram showing a functional configuration of the conversion function generating process according to the embodiment of the present invention. Referring to FIG. 10, the image processing apparatus according to the present embodiment includes: as its main functional configurations, an image managing unit 10 including a data storing unit 12; a histogram generating unit 14; a determining unit 16; a distance calculating unit 18; a data storing unit 20; and a density value converting unit 24.

Image managing unit 10 receives an image input from the camera and the like, and stores the image in data storing unit 12. This image stored in data storing unit 12 is output to histogram generating unit 14 and/or density value converting unit 24, as requested. Image managing unit 10 also receives an image subjected to density value conversion (color correction) in density value converting unit 24, and stores the image in data storing unit 12. Furthermore, image managing unit 10 outputs the image stored in data storing unit 12 to the display unit and the like, as requested. Data storing unit 12 is typically implemented by using a storage area provided by RAM 104 of image processing apparatus 100.

Histogram generating unit 14 reads a plurality of images stored in data storing unit 12 of image managing unit 10, and generates a histogram of density values of pixels included in each of the read images. Histogram generating unit 14 generates a simple histogram and/or a cumulative histogram.

By using the histogram generated by histogram generating unit 14, distance calculating unit 18 calculates a distance between the density values in a space defined to include a histogram frequency of the cumulative histogram and the density value. Distance calculating unit 18 outputs, to determining unit 16, the calculated distance for a combination of the density values.

Determining unit 16 determines a correspondence relation between the density values of the images based on the distance between the density values calculated by distance calculating unit 18, and determines a conversion function (density value conversion table 22) for correcting the density value between the images based on the determined correspondence relation.

Data storing unit 20 stores density value conversion table 22 determined by determining unit 16, and outputs density value conversion table 22 as requested by density value converting unit 24 and the like.

Density value converting unit 24 makes density value conversion (color correction) to the input images, based on density value conversion table 22. The images subjected to this density value conversion are stored in data storing unit 12 of image managing unit 10.

The details of the conversion function generating process according to the embodiment of the present invention will be described hereinafter, together with various modifications.

F. First Embodiment

First, a method for determining a conversion function (density value conversion table 22) by using a cumulative histogram of density values and the DP (Dynamic Programming) matching method will be described as a first embodiment.

Figure 11:
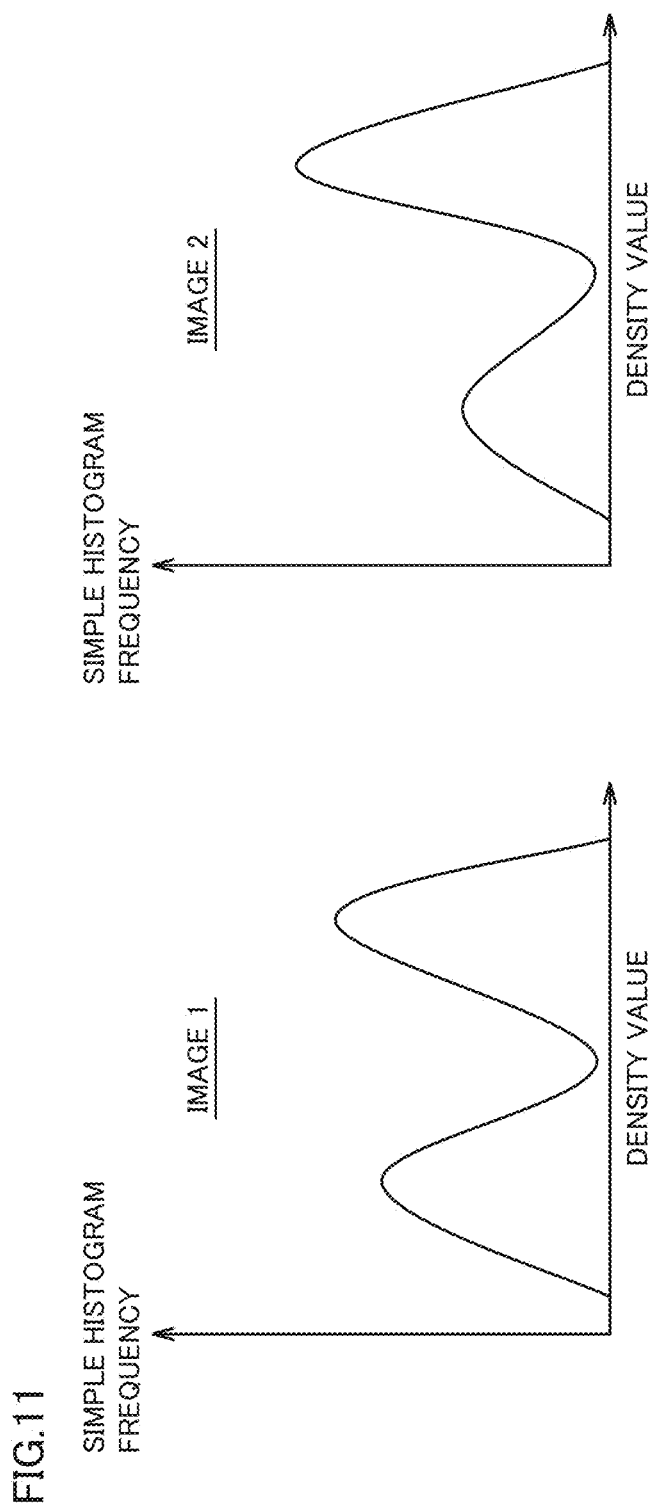
FIG. 11 is a diagram showing one example of a simple histogram generated in a first embodiment of the present invention.
Figure 12:
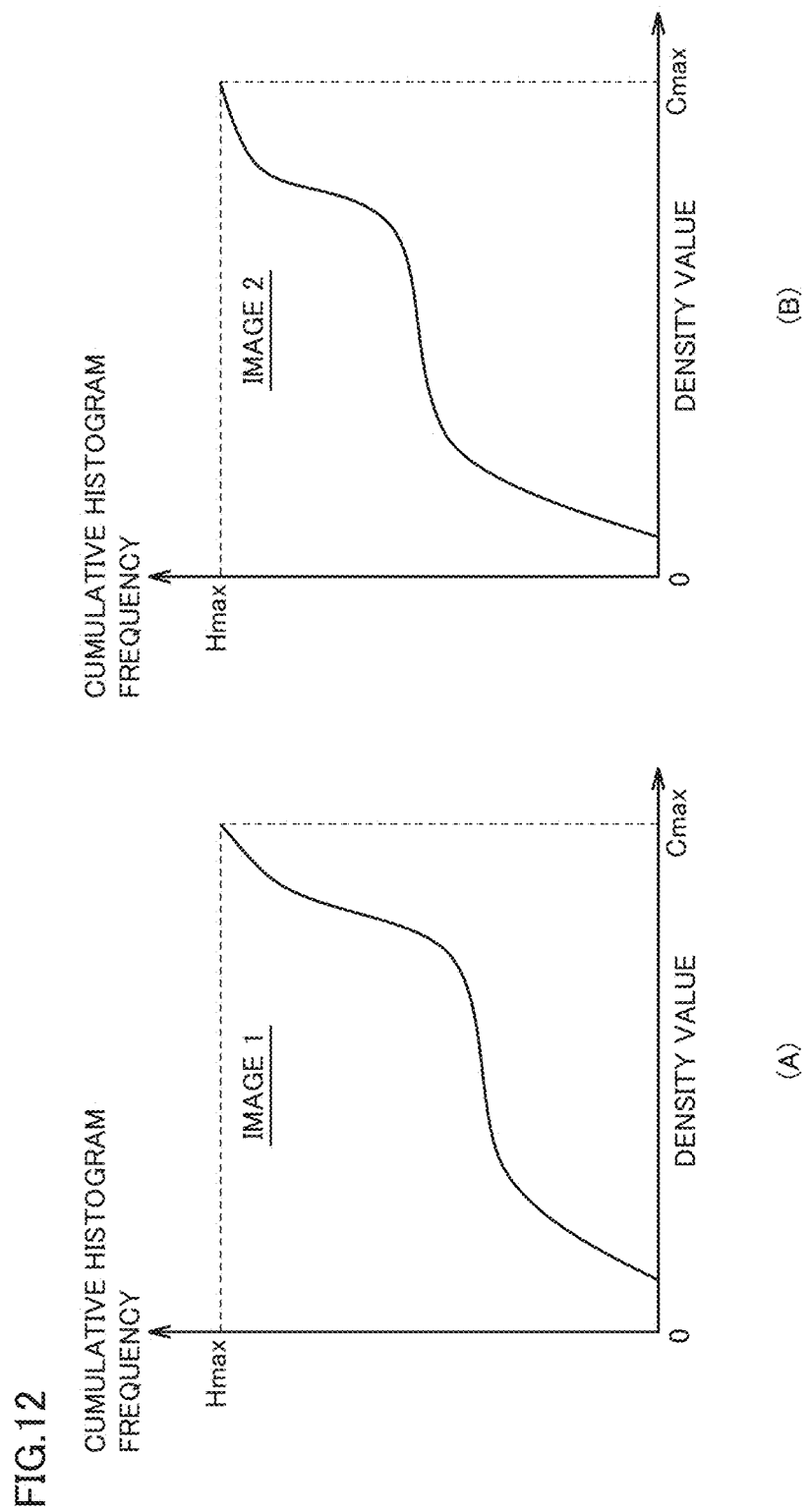
FIG. 12 is a diagram showing one example of a cumulative histogram generated from the simple histogram shown in FIG. 11.

FIG. 11 is a diagram showing one example of a simple histogram generated in the first embodiment of the present invention. FIG. 12 is a diagram showing one example of a cumulative histogram generated from the simple histogram shown in FIG. 11.

By way of example, images to be processed are image 1 and image 2 in which each pixel has a color defined by a density value of each of three channels (R, G and B) in the RGB color space. Even in the case of a monochromatic image having only a density value of one channel, the similar processing can be executed.

In the present embodiment, a simple histogram of the density values of each channel of the pixels included in each of image 1 and image 2 is generated. Namely, a total of three simple histograms of the R, G and B channels are generated for image 1, and a total of three simple histograms of the R, G and B channels are generated for image 2. Namely, the simple histogram shown in FIG. 11 is generated for each channel.

Then, cumulative histograms are generated from the simple histograms, respectively. At this time, in order to facilitate the processing, each cumulative histogram frequency is normalized by the maximum frequency such that the normalized histogram maximum frequency becomes Hmax. Namely, the cumulative histogram shown in FIG. 12 is generated for each channel.

It is assumed that the pixels included in each of image 1 and image 2 are expressed by a (Cmax+1) tone in which the maximum density value is Cmax.

The cumulative histogram shown in FIG. 12 can be regarded as a space defined to include the (normalized) cumulative histogram frequency and the density value of each channel. A distance dist(m,n) between a density value m of image 1 (an arbitrary coordinate on the cumulative histogram generated from image 1) and a density value n of image 2 (an arbitrary coordinate on the cumulative histogram generated from image 2) in this space is defined in accordance with equation (1):

$$\text{dist}(m,n) = \sqrt{(c\_\text{hist}_1(m) - c\_\text{hist}_2(n))^2 + (m-n)^2} \quad (1).$$

In equation (1), $c\_\text{hist}_1(m)$ represents the normalized cumulative histogram frequency of density value m of image 1, and $c\_\text{hist}_2(n)$ represents the normalized cumulative histogram frequency of density value n of image 2.

This distance dist(m,n) corresponds to the proximity between the density values in the space. Namely, as a value of distance dist(m,n) becomes smaller, density value m of image 1 and density value n of image 2 are more similar to each other.

In the present embodiment, when a sum of distances between the density values for all combinations of the density values of image 1 and the density values of image 2 is the smallest, a correspondence relation between the density value of image 1 and the density value of image 2 is evaluated as being optimized. Namely, determining unit 16 (FIG. 10) determines the correspondence relation between the density values such that a sum of distances between all density values included in the first image and corresponding density values included in the second image is the smallest. In other words, the correspondence relation between density value m of image 1 and density value n of image 2 is determined such that equation (2) is established:

$$\min\left[\sum_{i=0, j=0}^{i=m, j=n} \text{dist}(i, j)\right]. \quad (2)$$

The known dynamic programming method can be used as a method for searching for such a correspondence relation that minimizes the distance between the density values.

Figure 13:
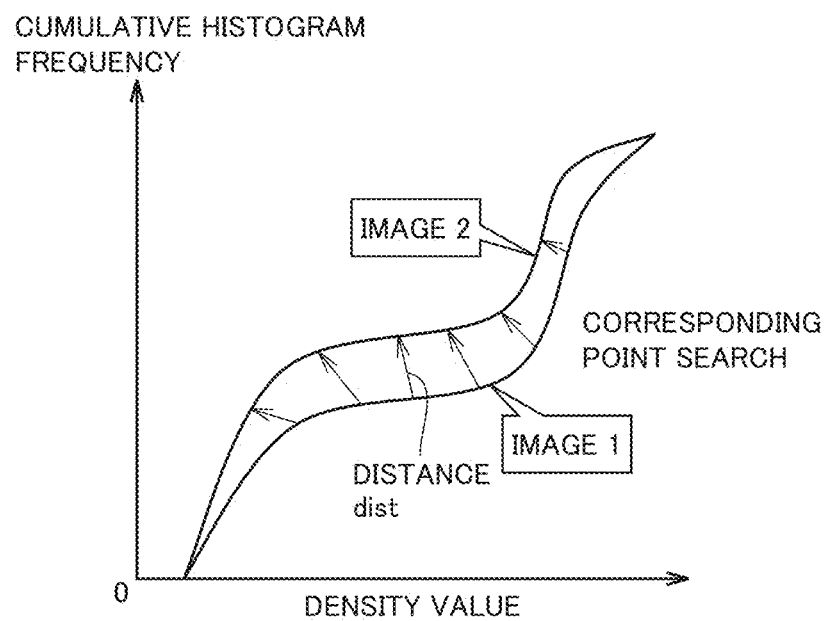
FIG. 13 is a diagram describing a process for searching for a correspondence relation according to the embodiment of the present invention.
Figure 14:
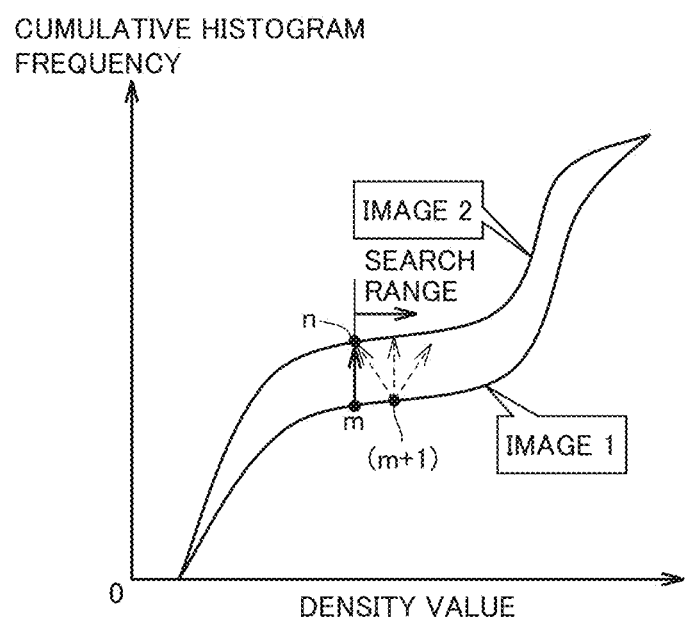
FIG. 14 is a diagram describing the process for searching for a correspondence relation according to the embodiment of the present invention.

FIGS. 13 and 14 are diagrams for describing a process for searching for the correspondence relation according to the embodiment of the present invention. As shown in FIG. 13, a distance from a density on one cumulative histogram to a density on the other cumulative histogram is sequentially calculated, thereby determining a combination of densities in which a sum of the distances is the smallest.

In the present embodiment, the cumulative histogram is generated by accumulating the histogram frequencies from a smaller density value to a larger density value. Therefore, in the correspondence relation between the density values, the order about the magnitude relation of the density values does not change. Namely, when density value m of image 1 corresponds to density value n of image 2, the next density value (m+1) of image 1 does not correspond to any density values before a density value (n−1) of image 2.

Therefore, in the present embodiment, determining unit 16 (FIG. 10) determines the correspondence relation between the density values by using the magnitude relation of the density values included in image 1 and the magnitude relation of the density values included in image 2, which correspond to the density values included in image 1. More specifically, as shown in FIG. 14, when it is determined that density value m on the cumulative histogram of image 1 corresponds to density n on the cumulative histogram of image 2, a correspondence relation regarding the density value (m+1) subsequent to density value m on the cumulative histogram of image 1 is determined as a search target for density value n or a density value larger than density value n on the cumulative histogram of image 2. This is based on the rule for generation of the cumulative histogram described above.

As described above, when density value m included in image 1 corresponds to density value n included in image 2, determining unit 16 (FIG. 10) determines the correspondence relation regarding the density value (m+1) larger than density value m included in image 1, as a search target for a density value (≥n) equal to or larger than density value n included in image 2. By using the aforementioned rule, the time and the calculation cost required for the search process can be reduced.

When the correspondence relation between the density values is determined by using the aforementioned search process, density value conversion table 22 showing this correspondence relation is generated and output.

FIG. 15 is a diagram showing one example of density value conversion table 22 generated by the conversion function generating process according to the embodiment of the present invention. As shown in FIG. 15, for each density value (tone value) of image 1, a corresponding density value (tone value) of image 2 is stored. FIG. 15 shows density value conversion table 22 when image 1 is subjected to density value conversion. However, density value conversion table 22 when image 2 is subjected to density value conversion may be used.

By using density value conversion table 22 to convert a density value of the image (in this example, image 1), density value converting unit 24 (FIG. 10) can bring a density value of image 1 closer to a density value of image 2. As a result, it is possible to improve a difference in color tone between image 1 and image 2, and the like.

The present embodiment described above is also applicable to the case in which density values of the pixels included in the image is expressed by using various types of other color spaces such as, for example, the CMY color space, the YUV color space, the XYZ color space, the xyY color space, the L*u*v* color space, and the L*a*b* color space. Furthermore, the present embodiment is applicable not only to density value correction between stereoscopically captured images but also to density value correction (color matching) between panoramic images.

As described above, in the present embodiment, the cumulative histogram of the density values is used as the histogram of the density values to generate the conversion function (density value conversion table). When each pixel included in the image is defined by means of the density values of a plurality of channels, the distance between the density values is calculated for each channel.

According to the present embodiment, even when a plurality of images are different in color tone and the like, color correction can be made with the relatively easy process and with reduced generation of a false texture and the like. In addition, the order about the magnitude relation of the density values included in the image is used, and thus, the calculation time and the calculation cost can be further reduced.

G. Second Embodiment

Next, as a second embodiment, description will be given to a configuration in which weight is used when a distance between density values of images is calculated in a space. The second embodiment is different from the first embodiment only in terms of the method for calculating the distance in distance calculating unit 18 (FIG. 10). The other processing and configuration are the same as those of the first embodiment, and thus, detailed description about the common parts will not be repeated.

As described above, the distance between the density values is calculated in the space defined to include the histogram frequencies of the cumulative histogram and the density values. However, the magnitudes in the axial directions (the histogram frequencies and the density values) do not necessarily need to be equivalently treated when the distance between the density values is calculated. Thus, it is preferable to provide appropriate weights to an axial component of the histogram frequency and an axial component of the density value.

By way of example, three weighting methods will be described hereinafter.

(f1: Weights Provided in Axial Directions)

First, it is assumed that weights wh and wc are set for the respective axial components in distance dist(m,n) defined in equation (1) above. In this case, equation (1) above can be modified into equation (3):

$$\text{dist}(m,n) = \sqrt{w_h(c\_hist_1(m) - c\_hist_2(n))^2 + w_c(m-n)^2} \qquad (3).$$

Figure 16:
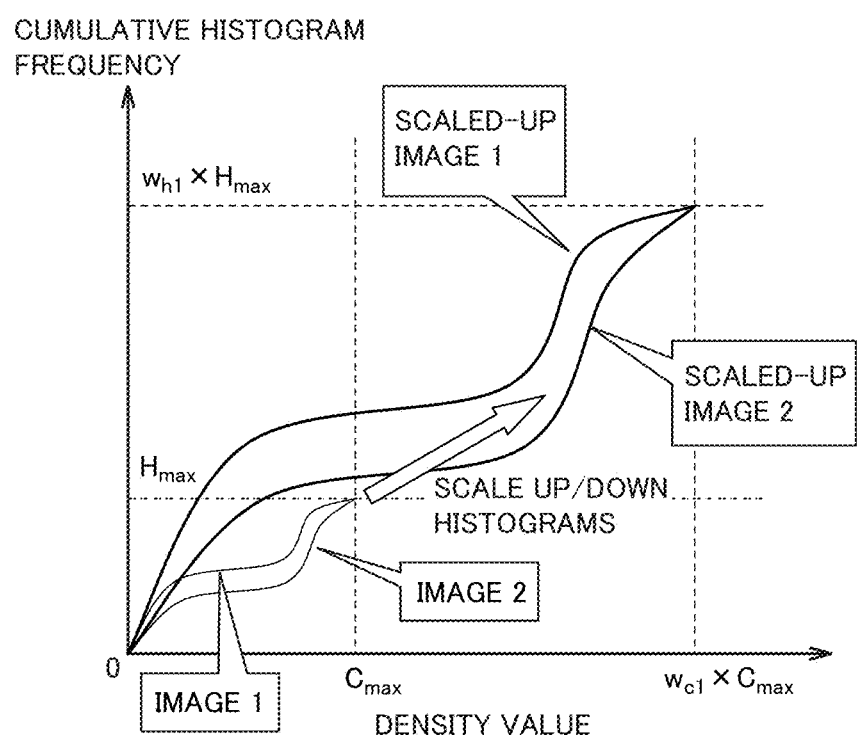
FIG. 16 is a diagram for describing weight setting according to a second embodiment of the present invention.

FIG. 16 is a diagram for describing weight setting according to the second embodiment of the present invention. Referring to FIG. 16, weights wh and wc included in equation (3) are weights set in the axial directions of the cumulative histogram frequency and the density value, respectively. As these weights become larger, the calculated distance becomes longer. In other words, the histogram is scaled up or down.

Preset fixed values are typically used as these weights wh and wc. As described below, however, weights wh and wc may be dynamically changed. Alternatively, only one of weights wh and wc may be used.

As described above, in the present embodiment, the process for calculating the distance between the density values as shown in FIG. 9 (step S12) includes the process for setting the weight for at least one of the distance in the axial direction corresponding to the histogram frequency and the distance in the axial direction corresponding to the density value in the space when calculating the distance between the density values.

By appropriately setting the weight in each axial direction in the space as described above, the distance (proximity) between the density values can be set more appropriately.

(f2: Weight Based on Histogram Frequency)

Next, description will be given to a process for changing the weight based on the histogram frequency of the density values of interest. As shown in FIG. 13 above, the direction of searching for the correspondence relation between the density values changes depending on the magnitude of the histogram frequency. Thus, by changing a weight coefficient in accordance with the histogram frequency of the density values to be searched, the appropriate search direction can be dynamically set.

For example, in the case where weight wh is changed in accordance with the magnitude of the cumulative histogram frequency, a function like equation (4) below may be used:

$$w_h = \frac{c\_hist_1(n) + c\_hist_2(n)}{2H_{max}}. \quad (4)$$

Figure 17:
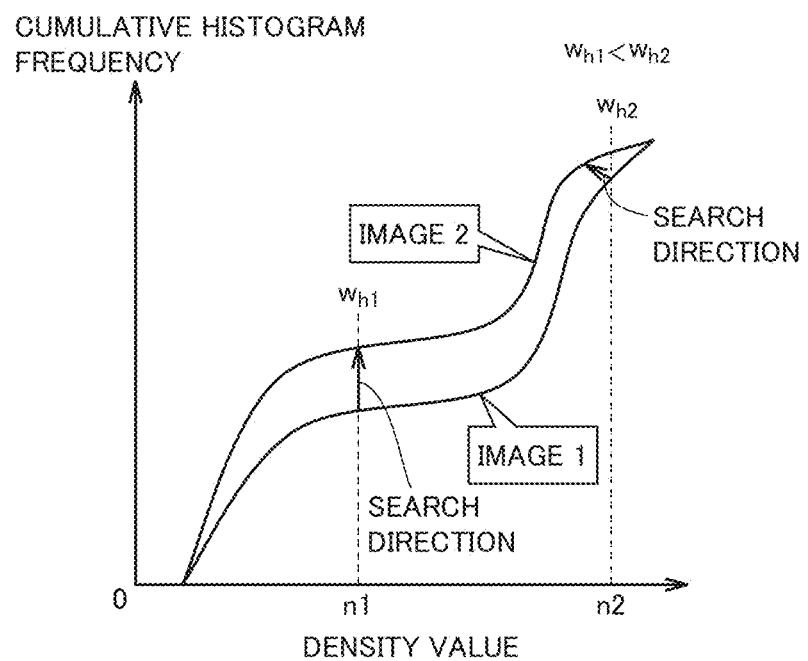
FIG. 17 is a diagram for describing a process for setting weight based on cumulative histogram frequencies according to the second embodiment of the present invention.

FIG. 17 is a diagram for describing a process for setting weight based on the cumulative histogram frequency according to the second embodiment of the present invention. As shown in FIG. 17, a range where the histogram frequency is large is close to a density saturation area, and there is a high possibility that the shape of the cumulative histogram is flat. Therefore, it is preferable to conduct search in the axial direction of the density value. In contrast, in a range where the histogram frequency is not so large, there is some margin before density saturation is reached. Therefore, it is preferable to conduct search in the axial direction of the histogram frequency.

By using the weight like equation (4) above, the distance in the axial direction of the histogram frequency is calculated to be relatively long in the range where the histogram frequency is large. Therefore, as a reflective effect, search is conducted in the axial direction of the density value. In contrast, in the range where the histogram frequency is not large, the distance in the axial direction of the density value is calculated to be relatively long. Therefore, as a reflective effect, search is conducted in the axial direction of the histogram frequency.

By determining the weight based on the histogram frequency as described above, the appropriate search direction can be dynamically determined and the correspondence relation between the density values can be determined more appropriately.

The search direction changes depending on a ratio between weight wh and weight wc. Therefore, both weights wh and wc may be used (changed), or only one of weights wh and wc may be used (changed).

As described above, in the present embodiment, the process for calculating the distance between the density values as shown in FIG. 9 (step S12) includes the process for setting the weight in accordance with the distance in the axial direction corresponding to the histogram frequency in the space when calculating the distance.

According to the present embodiment, the search direction corresponding to the density value is dynamically set, and thus, the correspondence relation between the density values can be searched more appropriately.

(f3: Weight Based on Density Value)

Next, description will be given to a process for changing the weight based on the density value of interest. When a difference between a density value before conversion and a density value after conversion is large in the process for converting the density value even if the distance between the density values in the space is relatively short, a problem may arise in terms of the quality of the image. Therefore, it is preferable to conduct search intensively in the axial direction of the histogram frequency. Thus, by changing the weight coefficient in accordance with the density value of interest, the appropriate search direction can be dynamically set.

For example, in the case where weight wh is changed in accordance with the difference between the density values, a function like equation (5) below may be used:

$$w_h = \frac{C_{max}}{|n-m|+1}. \quad (5)$$

Figure 18:
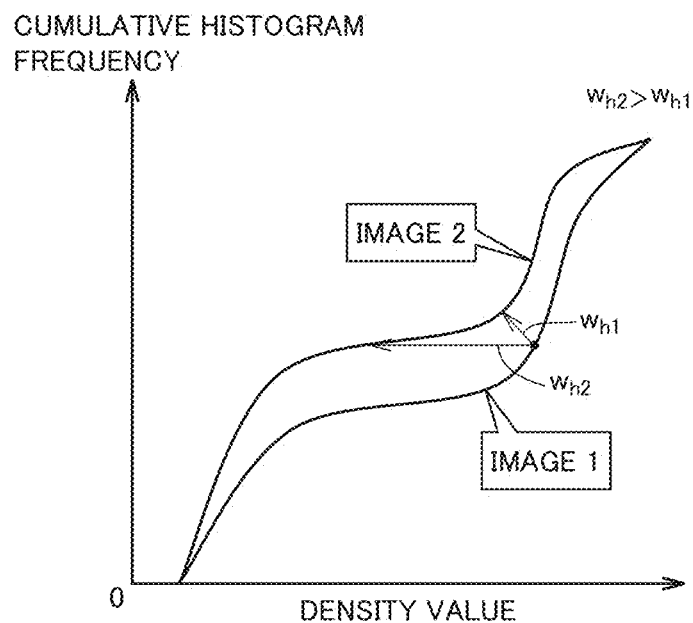
FIG. 18 is a diagram for describing a process for setting weight based on a density value according to the second embodiment of the present invention.

FIG. 18 is a diagram for describing a process for setting the weight based on the density value according to the second embodiment of the present invention. As shown in equation (5), as a difference between the density value of interest and the density value to be searched becomes larger, weight wh becomes smaller. Therefore, as a reflective effect, weight we is evaluated to be relatively large. Namely, as the difference between the density value of interest and the density value to be searched becomes smaller, the calculated distance becomes relatively shorter. In other words, when search is conducted in the axial direction of the density value, the calculated distance becomes relatively long. Therefore, as a reflective effect, search is preferentially conducted along the axial direction of the histogram frequency.

More specifically, as shown in FIG. 18, a weight wh1 when the difference between the density values is relatively small is smaller than a weight wh2 when the difference between the density values is relatively large. Therefore, search can be conducted with emphasis on the density difference.

By determining the weight based on the density value as described above, the correspondence relation with smaller difference between the density values can be determined.

As described above, in the present embodiment, the process for calculating the distance between the density values as shown in FIG. 9 (step S12) includes the process for setting the weight in accordance with the distance in the axial direction corresponding to the density value in the space when calculating the distance.

According to the present embodiment, search is conducted such that the density difference becomes smaller. Therefore, determination of the correspondence relation with large difference between the density values can be prevented, and thus, the correspondence relation between the density values can be searched more appropriately.

(f4: Weight Based on Histogram Frequency and Density Value)

Next, description will be given to a process for changing the weight based on the histogram frequency and the density value. More specifically, an inclination of the cumulative histogram of the density values of interest is calculated based on the magnitudes of the density value of interest and the histogram frequency of this density value, and the weight is determined based on the calculated inclination. By using such an inclination of the cumulative histogram, search is conducted in the axial direction of the density value in a range where the inclination of the cumulative histogram is steep, and search is conducted in the axial direction of the histogram frequency in a range where the inclination of the cumulative histogram is gentle. By changing the weight coefficient in accordance with the aforementioned method, the appropriate search direction can be dynamically set.

For example, in the case where weight wh is changed in accordance with the magnitude of the cumulative histogram frequency, a function like equation (6) below may be used:

$$w_h = \cos(\theta_1(n) - \theta_2(n))$$

$$\cos(\theta_1(n)) = \frac{n - (n-1)}{\sqrt{(n-(n-1))^2 + (c\_hist_1(n) - c\_hist_1(n-1))^2}} \quad (6)$$

$$\cos(\theta_2(n)) = \frac{n - (n-1)}{\sqrt{(n-(n-1))^2 + (c\_hist_2(n) - c\_hist_2(n-1))^2}}.$$

Figure 19:
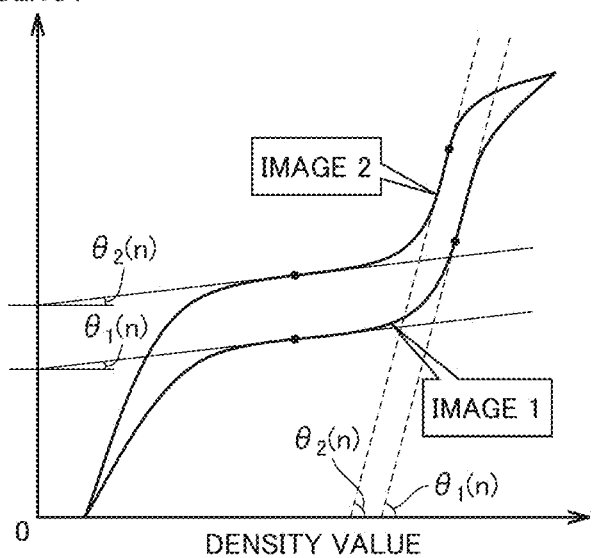
FIG. 19 is a diagram for describing a process for setting weight based on the histogram frequencies and the density values according to the second embodiment of the present invention.

FIG. 19 is a diagram for describing a process for setting the weight based on the histogram frequency and the density value according to the second embodiment of the present invention. As shown in FIG. 19, which of the axial direction of the histogram frequency and the axial direction of the density value is mainly used for search is dynamically changed in accordance with the inclination (tangent) of the cumulative histogram of the density values of interest. Namely, search is conducted mainly in the axial direction of the histogram frequency in the range where the inclination is gentle, and search is conducted mainly in the axial direction of the density value in the range where the inclination is steep.

As described above, in the present embodiment, the process for calculating the distance between the density values as shown in FIG. 9 (step S12) includes the process for setting the weight in accordance with the histogram frequency and the density value.

According to the present embodiment, search is conducted in the axial direction of the histogram frequency when the inclination of the cumulative histogram is flat, and search is conducted in the axial direction of the density value when the inclination is steep. Therefore, search can be conducted in accordance with the shape of the cumulative histogram.

H. Third Embodiment

Next, as a third embodiment, in the case where the histograms intersect with each other in the space when the correspondence relation between the density values is searched, the correspondence relation may be wrongly determined in some cases. Thus, description will be given to a configuration that can prevent this wrong determination of the correspondence relation due to occurrence of intersection of the histograms. The third embodiment is different from the first embodiment only in terms of the method for calculating the distance in determining unit 16 and distance calculating unit 18 (FIG. 10). The other processing and configuration are the same as those of the first embodiment, and thus, detailed description about the common parts will not be repeated.

Figure 20:
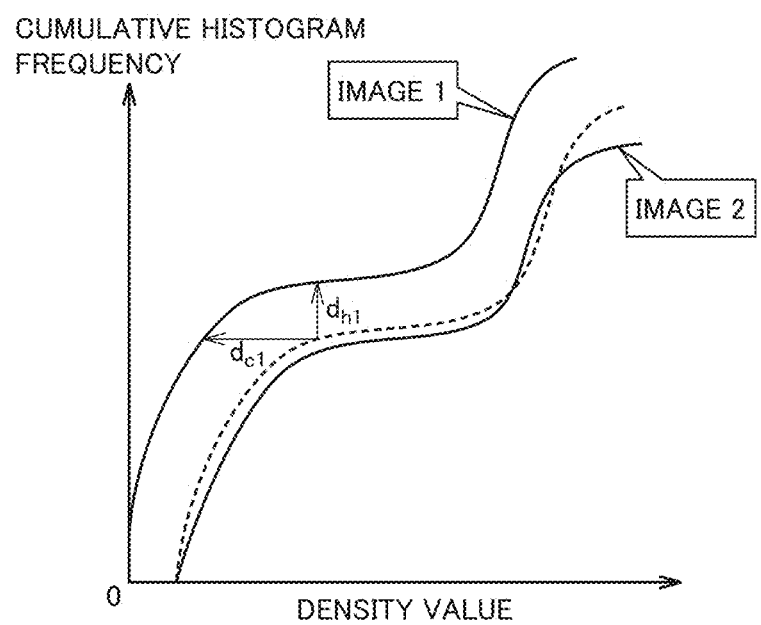
FIG. 20 is a diagram for describing intersection of histograms handled by a conversion function generating process according to a third embodiment of the present invention.

FIG. 20 is a diagram for describing intersection of the histograms handled by the conversion function generating process according to the third embodiment of the present invention. Referring to FIG. 20, when the histogram of image 1 is indicated by a broken line and intersects with the histogram of image 2, density points near intersection may be wrongly associated in some cases. Thus, in the present embodiment, in such a case, one histogram is moved in parallel on the space to overcome intersection with the other histogram, and then, a process for searching for a corresponding point is executed. By the aforementioned parallel movement of the histogram, the wrong association caused by intersection of the histograms can be avoided.

More specifically, assuming that $d_{h1}$ represents an amount of movement in the axial direction of the histogram frequency, and $d_{c1}$ represents an amount of movement in the axial direction of the density value, distance dist(m,n) between density value m of image 1 (an arbitrary coordinate on the cumulative histogram obtained by shifting the cumulative histogram generated from image 1) and density value n of image 2 (an arbitrary coordinate on the cumulative histogram generated from image 2) can be calculated in accordance with equation (7):

$$\text{dist}(m,n) = \sqrt{((c\_hist_1(m)+d_{h1})-c\_hist_2(n))^2 + ((m+d_{c1})-n)^2} \qquad (7).$$

By calculating the distance between the density values in accordance with this equation (7), the correspondence relation between the density values can be searched and determined in accordance with the procedure similar to the above.

As described above, in the present embodiment, the process for determining the correspondence relation between the density value included in image 1 and the density value included in image 2 as shown in FIG. 9 (step S14) includes the process for moving at least one of the histogram of image 1 and the histogram of image 2 in parallel in the space and calculating the distance.

The amount of movement required for the aforementioned parallel movement that is necessary to overcome intersection of the histograms can be preliminarily adjusted by using a method described below.

(h1: Determination of Amount of Movement Based on Histogram Frequency)

As a simple method, the presence or absence of intersection of the histograms can be determined based on a difference between the histogram frequencies of the two cumulative histograms corresponding to the same density value. Namely, a difference between the cumulative histogram frequencies at density value n is sequentially calculated and a minimum value $\text{Hdist}_{min}$ of the smallest difference between the cumulative histogram frequencies, among all density values, is calculated. Namely, minimum value $\text{Hdist}_{min}$ can be calculated in accordance with equation (8) below:

$$H\text{dist}_{min} = \min(c\_hist_1(n) - c\_hist_2(n)) \qquad (8).$$

When minimum value $\text{Hdist}_{min}$ thus calculated is smaller than 0, it can be determined that intersection of the histograms is present. In this case, amount of movement $d_{h1}$ is set such that intersection of the histograms does not occur. Namely, intersection of the histograms can be overcome by shifting one histogram by at least minimum value $\text{Hdist}_{min}$, and thus, amount of movement $d_{h1}$ is set in accordance with equation (9) below, for example:

$$d_{h1} = \begin{cases} -H\text{dist}_{min} & (H\text{dist}_{min} < 0) \\ 0 & (H\text{dist}_{min} \geq 0) \end{cases}. \qquad (9)$$

By using the aforementioned method, occurrence of intersection of the histograms can be reduced and the correspondence relation between the density values can be determined more appropriately.

(h2: Determination of Amount of Movement Based on Histogram Frequency for Plurality of Channels)

In the aforementioned method, the amount of movement is determined such that intersection of the histograms does not occur in each channel. However, when each pixel included in the image is defined by density values of a plurality of channels, it is preferable to average the amount of movement of the histogram between the channels, and the like. A method for determining the amount of movement of the histogram in each channel in accordance with the aforementioned method will be described hereinafter.

First, a maximum distance $\text{Hdist}_{ch,max}$ between the histogram of image 1 and the histogram of image 2 is calculated for each channel in accordance with equation (10). Next, maximum distance $\text{Hdist}_{ch,max}$ calculated for each channel is averaged in accordance with equation (11). Namely, an average value of maximum distances $Hdist_{ch,max}$ for the plurality of channels is calculated.

Finally, in accordance with equation (12), amount of movement $d_{h1}$ in each channel is determined such that the maximum distance between the histograms for all channels becomes $Hdist_{ave,max}$.

$$Hdist_{ch,max} = \max |c\_hist_1(n) - c\_hist_2(n)| \qquad (10)$$

$$Hdist_{ave,max} = \text{average}(Hdist_{ch,max}) \qquad (11)$$

$$d_{h1} = Hdist_{ch,max} - Hdist_{ave,max} \qquad (12).$$

By using the aforementioned method, the maximum distance between the histograms becomes substantially the same in any of the channels. Therefore, a similar process for associating the density values can be executed and the density value conversion tables having similar shapes can be generated. Thus, a density balance among the channels (RGB) after density value conversion can be maintained.

I. Fourth Embodiment

Next, as a fourth embodiment, by searching for the correspondence relation between the density values with regard to only some effective density values, of all density values included in the image, the time and the calculation cost required for the process for searching for the correspondence relation can be reduced. Thus, in the present embodiment, description will be given to a configuration in which a density value range subjected to distance calculation is limited and the distance is calculated. The fourth embodiment is different from the first embodiment only in terms of the process for searching for the correspondence relation in determining unit 16 (FIG. 10) and the method for calculating the distance in distance calculating unit 18 (FIG. 10). The other processing and configuration are the same as those of the first embodiment, and thus, detailed description about the common parts will not be repeated.

Figure 21:
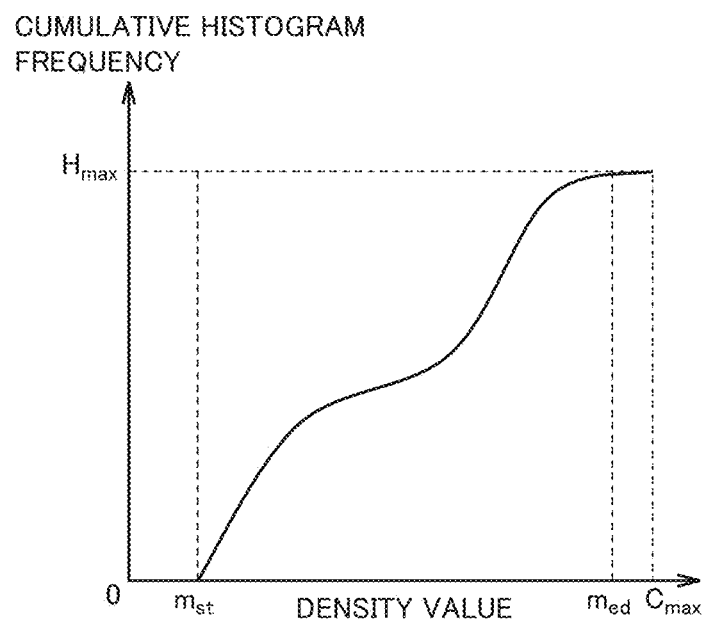
FIG. 21 is a diagram for describing a process for searching for a correspondence relation according to a fourth embodiment of the present invention.
Figure 22:
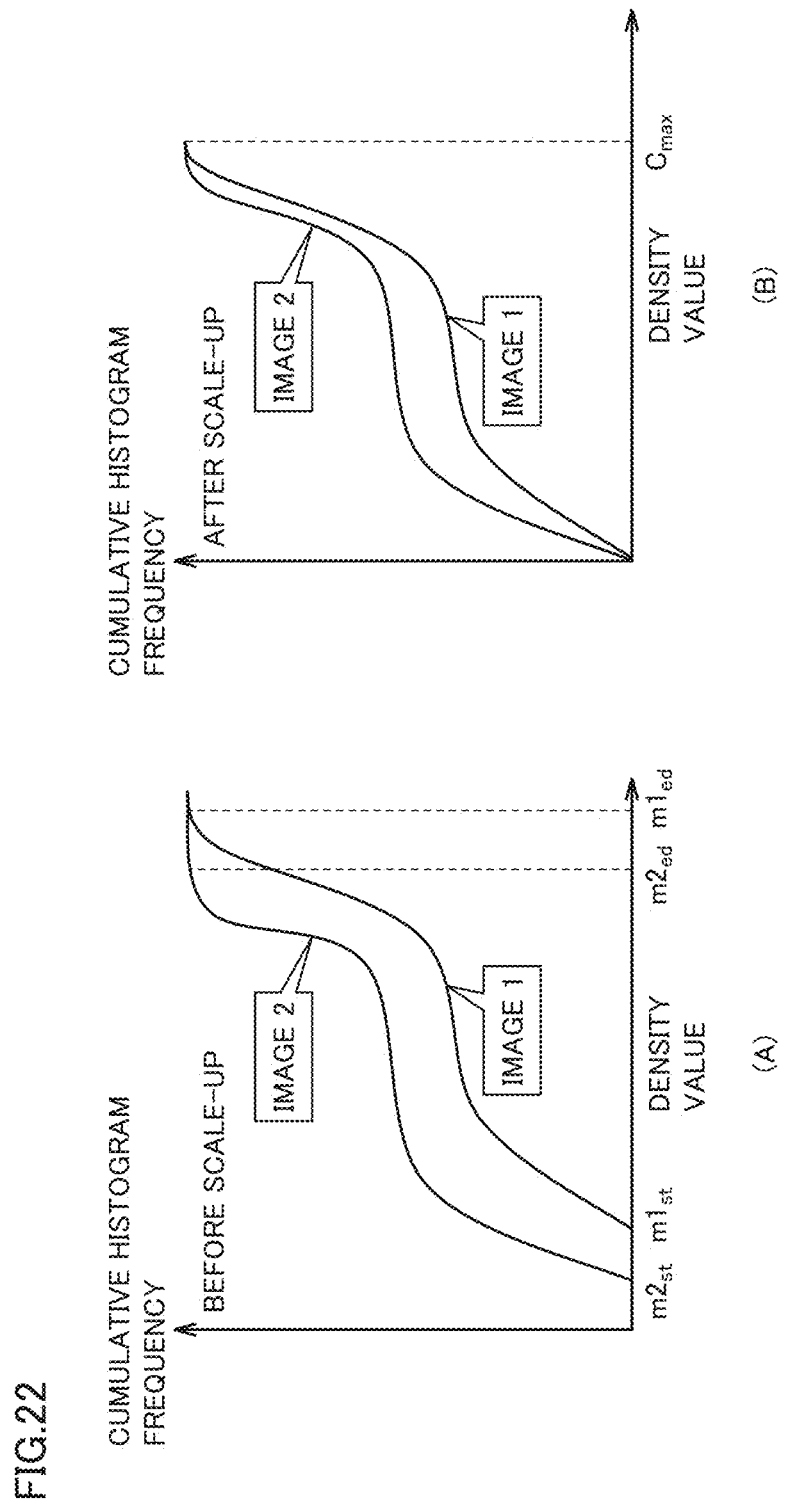
FIG. 22 is a diagram for describing the process for searching for a correspondence relation according to the fourth embodiment of the present invention.

FIGS. 21 and 22 are diagrams for describing a process for searching for the correspondence relation according to the fourth embodiment of the present invention.

When the correspondence relation between the density values is searched (determined), it is not necessary to calculate the distance and search for the correspondence relation for all density values c_hist(n) included in the image. For example, in a cumulative histogram shown in FIG. 21, the distance is calculated in a range $(m_{st} \leq n \leq m_{ed})$ of density value n in which corresponding normalized histogram frequency c_hist(n) is 0<c_hist(n)<Hmax, and the process for searching for the correspondence relation is executed based on the calculated distance.

More specifically, as for a start value $m_{st}$ of the density value, checking is conducted in ascending order from a density value n=0 and the smallest n that satisfies 0<c_hist(n) is determined as start value $m_{st}$ of the density value. As for an end value $m_{ed}$ of the density value, checking is conducted in descending order from a density value n=Cmax and the largest n that satisfies c_hist(n)<Hmax is determined as end value $m_{ed}$ of the density value. By using these start value $m_{st}$ and end value $m_{ed}$, the range of search for the correspondence relation between the density values is determined for each of image 1 and image 2.

Generally, the density values present at both ends of the cumulative histogram are often noise components and the like. Therefore, by limiting the search range as described above, unwanted combinations of the density values can be excluded. As a result, the time and the calculation cost required for the process for searching for the correspondence relation can be reduced and the process for associating the density values can be executed at higher speed.

However, according to the aforementioned method, the correspondence relation is not determined for the density values present at both ends of the cumulative histogram. Therefore, for the density values outside the search range, a conversion function (density value conversion table) is generated by interpolation (typically, linear interpolation) and the like of the correspondence relation within the search range.

When the search range for image 1 is different from the search range for image 2, it is preferable to expand the histograms such that the start point and the end point of the histogram of image 1 match with the start point and the end point of the histogram of image 2. More specifically, it is preferable to scale up/down the cumulative histograms generated from image 1 and image 2 along the axial direction of the density value, while maintaining the shapes of the cumulative histograms. By executing this expansion process, the cumulative histograms of image 1 and image 2 have a resembling shape, and thus, the process for searching for the correspondence relation between the density values can be executed with a higher degree of accuracy.

For example, in cumulative histograms shown in FIG. 22(A), it is assumed that the search range for the cumulative histogram of image 1 is $m1_{st} \leq n \leq m1_{ed}$ and the search range for the cumulative histogram of image 2 is $m2_{st} \leq n \leq m2_{ed}$. In such a state, as shown in FIG. 22(B), the cumulative histogram of image 1 is scaled up/down along the axial direction of the density value such that a start value $m1_{st}$ corresponds to the density value of 0 and an end value $m1_{ed}$ corresponds to maximum density value Cmax. Similarly, the cumulative histogram of image 2 is scaled up/down along the axial direction of the density value such that a start value $m2_{st}$ corresponds to the density value of 0 and an end value $m2_{ed}$ corresponds to maximum density value Cmax.

As described above, each cumulative histogram scaled up/down along the axial direction of the density value is as shown in FIG. 22(B). As shown in FIG. 22(B), both of the scaled-up cumulative histograms of image 1 and image 2 distribute in the range from the density value of 0 to Cmax. The process for searching for the correspondence relation between the density values is executed on the scaled-up/down histograms shown in FIG. 22(B).

As described above, in the present embodiment, the process for determining the correspondence relation between the density value included in image 1 and the density value included in image 2 as shown in FIG. 9 (step S14) includes the process for limiting the density value range subjected to determination of the correspondence relation and determining the correspondence relation between the density values as shown in FIG. 21. Furthermore, the process for determining the correspondence relation (step S14) may include the process for expanding the histogram in the limited density value range, of the histogram of image 1 and the histogram of image 2, and calculating the distance as shown in FIG. 22.

According to the present embodiment, the search range for associating the density values is limited, and thus, the process can be executed at higher speed.

The method for limiting the search range according to the present embodiment is also similarly applicable to the simple (normal) histogram. More specifically, by associating the density values only in a range where the histogram frequency is not 0 (i.e., only for the pixel values corresponding to the colors used in the image), the process can be executed at higher speed.

J. Reference Example

Next, description will be given to a reference example in which the conversion function (density value conversion table 22) is determined by using the simple histogram of the density values and the least square method.

By way of example, images to be processed are image 1 and image 2 in which each pixel has a color defined by a density value of each of three channels (R, G and B) in the RGB color space. Even in the case of a monochromatic image having only a density value of one channel, the similar processing can be executed.

In this reference example, a simple histogram of the density values of each channel of the pixels included in each of image 1 and image 2 is generated. Namely, a total of three simple histograms of the R, G and B channels are generated for image 1, and a total of three simple histograms of the R, G and B channels are generated for image 2. At this time, in order to facilitate the processing, the maximum frequency is extracted from simple histogram frequencies of the simple histograms, and a corresponding simple histogram is normalized by using this extracted maximum frequency.

It is assumed that the pixels included in each of image 1 and image 2 are expressed by a (Cmax+1) tone in which the maximum density value is Cmax.

This normalized simple histogram can be regarded as a space defined to include the (normalized) simple histogram frequency and the density value of each channel (R, G and B). Proximity dist(m,n) between density value m of image 1 (an arbitrary coordinate on the simple histogram generated from image 1) and density value n of image 2 (an arbitrary coordinate on the simple histogram generated from image 2) in this space is defined in accordance with equation (13):

$$\text{dist}(m,n) = \cos(\theta_2(n) - \theta_1(m)) \tag{13}$$

By using the normalized histogram frequency and the density value, inclinations $\theta_1$ and $\theta_2$ are calculated in accordance with equation (14):

$$\cos(\theta_1(n)) = \frac{n - (n-1)}{\sqrt{(n-(n-1))^2 + (hist_1(n) - hist_1(n-1))^2}} = \frac{1}{\sqrt{1 + (hist_1(n) - hist_1(n-1))^2}} \tag{14}$$

$$\cos(\theta_2(n)) = \frac{n - (n-1)}{\sqrt{(n-(n-1))^2 + (hist_2(n) - hist_2(n-1))^2}} = \frac{1}{\sqrt{1 + (hist_2(n) - hist_2(n-1))^2}}$$

In equation (14), $hist_1(m)$ represents the normalized histogram frequency of density value m of image 1, and $hist_2(n)$ represents the normalized histogram frequency of density value n of image 2.

In equation (13), proximity dist(m,n) corresponds to the degree of similarity between the inclinations (amounts of change) of the simple histograms in the space and is defined by using the inclinations of the histograms at a certain density value. Namely, as a value of proximity dist(m,n) becomes larger, density value m of image 1 and density value n of image 2 are more similar to each other.

Using a matrix A and a vector b, the density value of image 1 and the density value of image 2 can be expressed by equation (15):

$$c_2 = Ac_1 + b. \tag{15}$$

$$c_1 = \begin{pmatrix} hist_1(0) \\ hist_1(1) \\ \vdots \\ hist_1(C_{max}) \end{pmatrix}, c_2 = \begin{pmatrix} hist_2(0) \\ hist_2(1) \\ \vdots \\ hist_2(C_{max}) \end{pmatrix}, b = \begin{pmatrix} b_0 \\ b_1 \\ \vdots \\ b_{C_{max}} \end{pmatrix}$$

$$A = \begin{pmatrix} a_{00} & \cdots & a_{C_{max}0} \\ \vdots & \ddots & \vdots \\ a_{0C_{max}} & \cdots & a_{C_{max}C_{max}} \end{pmatrix}.$$

In this reference example, when a sum of proximities between the density values of image 1 and the density values of image 2 after density value conversion, for all combinations of the density values of image 1 and the density values of image 2, is the largest, a correspondence relation between the density value of image 1 and the density value of image 2 is evaluated as being optimized. Namely, when S(Cmax, Cmax) calculated in accordance with equation (16) is the largest, the correspondence relation between the density values can be determined as optimum. When the correspondence relation between the density values is determined (searched), a limiting condition for equation (15) is that the order about the magnitude relation of the density values does not change.

$$S(m, n) = \sum_{i=0}^{m} \sum_{j=0}^{n} dist(T(c_1(i)), c_2(j))^2 \tag{16}$$

By solving equation (15), matrix A and vector b that maximize S(Cmax, Cmax) are calculated. After these values are calculated, a matrix T indicating the density value conversion table is calculated in accordance with equation (17):

$$T = A^{-1}(c_2 - b) \tag{17}$$

The other points are the same as those of the aforementioned first to fourth embodiments, and thus, detailed description will not be repeated.

As described above, in this reference example, the simple histogram of the density values is used to generate the conversion function (density value conversion table). In this reference example, the inclinations on the simple histograms are used to determine the proximity between the density value of image 1 and the density value of image 2. Therefore, there is a problem that an error occurs easily depending on the shapes of the simple histograms. In this respect, use of the distance on the cumulative histograms to determine the proximity as described in the first to fourth embodiments is more excellent in accuracy.

K. Fifth Embodiment

The conversion function (density value conversion table) can be generated by using the methods described in the aforementioned first to fourth embodiments. However, depending on the shape of the histogram of the density values included in the input image, the correct correspondence relation between the density values is not always obtained. Thus, a process for subsequently correcting the generated conversion function (density value conversion table) will be described as a fifth embodiment.

Figure 23:
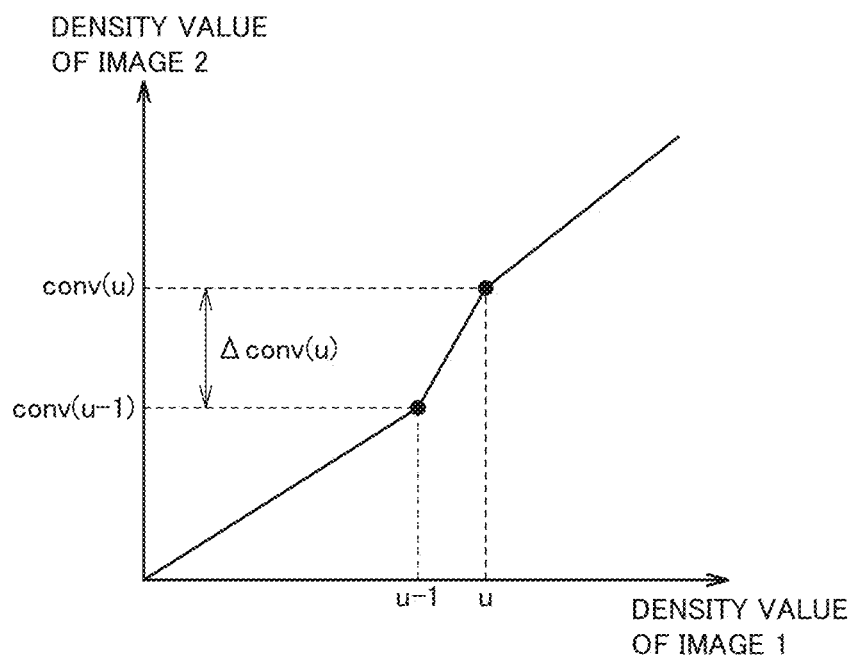
FIG. 23 is a diagram showing a failure example of a density value conversion table corrected in a fifth embodiment of the present invention.
Figure 24:
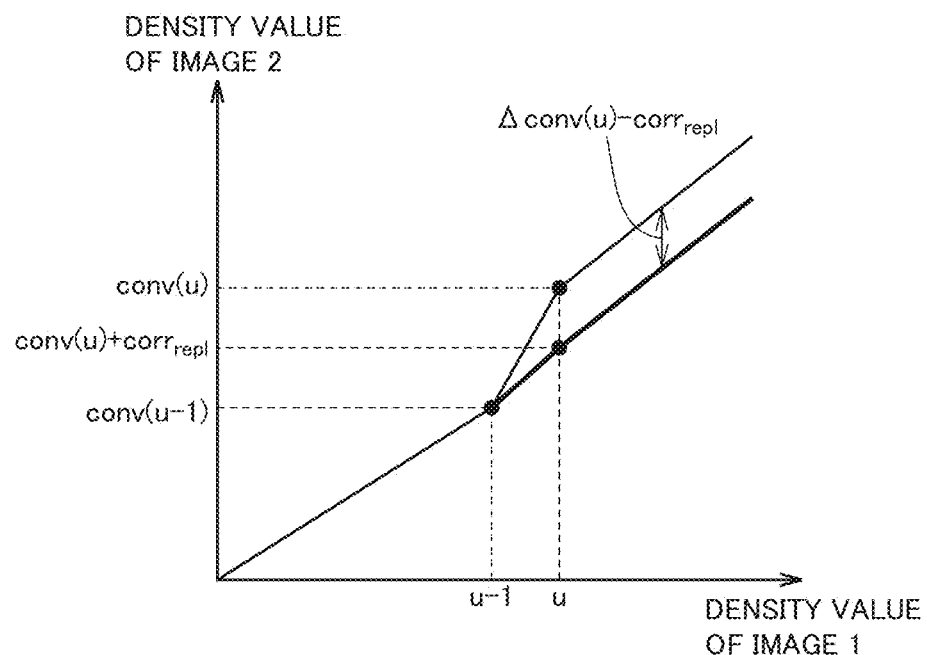
FIG. 24 is a diagram showing a correction example of the density value conversion table shown in FIG. 23.

FIG. 23 is a diagram showing a failure example of the density value conversion table corrected in the fifth embodiment of the present invention. FIG. 24 is a diagram showing a correction example of the density value conversion table shown in FIG. 23.

As shown in FIG. 23, for example, a portion of sharp change in correspondence relation between the density values is formed in the density value conversion table generated in a failed manner. In such a case, when this density value conversion table is used to convert the density value of the image, a sharp change occurs in the tone of the density value and a false texture may be generated.

In the present embodiment, in order to prevent the generation of such a false texture, the generated density value conversion table is checked and corrected when necessary (e.g., before executing the process for converting the density value of the image). More specifically, when there is a change beyond a prescribed limit range in the conversion function (density value conversion table 22), the contents of density value conversion table 22 are changed.

For convenience of description, it is assumed that conv(n) represents the density value of image 2 corresponding to density value n of image 1 in the conversion function (density value conversion table 22) immediately after generation (see FIG. 23).

First, as a procedure for correcting the density value conversion table, the values defined in the density value conversion table are sequentially checked in the density value 0≤n≤Cmax. More specifically, at a certain density value u of image 1, it is determined whether an amount of change in corresponding density value Δconv(u) (=conv(u)−conv(u−1)) exceeds a correction reference value $corr_{th}$ or not.

If amount of change Δconv(u) exceeds correction reference value $corr_{th}$, a value (density value after conversion) in the conversion table about a density value larger than density value u is updated such that amount of change in density value Δconv(u) becomes a correction value $corr_{repl}$. More specifically, in accordance with equation (18), the value in the conversion table is replaced by conv'(n) obtained by correcting corresponding conv(n):

$$conv'(n) = conv(n) - \Sigma(\Delta conv(u) - corr_{repl}) \quad (18)$$

Namely, the values (density values after conversion) in the conversion table larger than density value u are sequentially displaced by Δconv(u). Similarly, the process using conv'(n) obtained by correction is also executed on the density values larger than the density value (u+1).

Aforementioned correction reference value $corr_{th}$ can be set based on the following values.

(1) Average Value of Inclinations of Density Value Conversion Table

As shown in equation (19), an average value of inclinations of the density value conversion table may be used as correction reference value $corr_{th}$. Namely, in accordance with equation (19), the inclinations at both ends of the density value conversion table are calculated, and correction reference value $corr_{th}$ is determined by using these inclinations.

$$corr_{th} = 1.5 \times \frac{conv(C_{max}) - conv(0)}{C_{max}} \quad (19)$$

By using aforementioned correction reference value $corr_{th}$, failure of correction to the density value conversion table can be prevented without being dependent on the shape of the density value conversion table.

(2) Inclination of Density Value Conversion Table Near Current Density Value

As shown in equation (20), an inclination of the density value conversion table near the current density value may be used as correction reference value $corr_{th}$. Namely, in accordance with equation (20), the inclination of the density value conversion table near density value m of interest is calculated, and correction reference value $corr_{th}$ is determined by using this inclination.

$$corr_{th} = 1.5 \times \frac{1}{m} \sum_{n=m-10}^{m} conv(m) - conv(m-1) \quad (20)$$

By using aforementioned correction reference value $corr_{th}$, it is possible to handle local fluctuations in inclination of the density value conversion table.

(3) Inclination of Density Value Conversion Table from Central Density Value

As shown in equation (21), an inclination of the density value conversion table from a central density value may be used as correction reference value $corr_{th}$. Namely, in accordance with equation (21), the inclination between a center and an end of the density value conversion table is calculated, and correction reference value $corr_{th}$ is determined by using this inclination.

$$corr_{th} = 1.5 \times \frac{conv(C_{max}) - conv(C_{max}/2)}{C_{max}/2} \quad (21)$$

By using aforementioned correction reference value $corr_{th}$, it is also possible to handle the situation in which the inclination when the density value is large is greatly different from the inclination when the density value is small.

Next, correction value $corr_{repl}$ can be set based on the following values.

(1) Average Value of Inclinations of Density Value Conversion Table

As shown in equation (22) or equation (23), an average value of inclinations of the density value conversion table may be used as correction value $corr_{repl}$. Namely, in accordance with equation (22) and equation (23), the inclinations at both ends of the density value conversion table are calculated, and correction value $corr_{repl}$ is determined by using these inclinations.

$$corr_{repl} = \frac{conv(C_{max}) - conv(0)}{C_{max}} \quad (22)$$

$$corr_{repl} = \frac{1}{C_{max}} \sum_{n=1}^{C_{max}} conv(n) - conv(n-1) \quad (23)$$

By using aforementioned correction value $corr_{repl}$, failure of correction to the density value conversion table can be prevented without being dependent on the shape of the density value conversion table.

(2) Inclination of Density Value Conversion Table Near Current Density Value

As shown in equation (24), an inclination of the density value conversion table near the current density value may be used as correction value $corr_{repl}$. Namely, in accordance with equation (24), the inclination of the density value conversion table near density value m of interest is calculated, and correction value $corr_{repl}$ is determined by using this inclination.

$$corr_{repl} = \frac{1}{m} \sum_{n=m-10}^{m} conv(m) - conv(m-1) \qquad (24)$$

By using aforementioned correction value $corr_{repl}$, it is possible to handle local fluctuations in inclination of the density value conversion table.

(3) Inclination of Density Value Conversion Table from Central Density Value

As shown in equation (25), an inclination of the density value conversion table from a central density value may be used as correction value $corr_{repl}$. Namely, in accordance with equation (25), the inclination between a center and an end of the density value conversion table is calculated, and correction value $corr_{repl}$ is determined by using this inclination.

$$corr_{repl} = \frac{conv(C_{max}) - conv(C_{max}/2)}{C_{max}/2} \qquad (25)$$

By using aforementioned correction value $corr_{repl}$, it is also possible to handle the situation in which the inclination when the density value is large is greatly different from the inclination when the density value is small.

In the foregoing description, description has been given to the case in which the density value conversion table is corrected when amount of change in density value Δconv(u) exceeds the prescribed value. However, when some conditions are satisfied even if amount of change in density value Δconv(u) does not exceed the prescribed value, the density value conversion table may be corrected by using the method similar to the above.

As described above, in the present embodiment, the process for determining the correspondence relation between the density value included in image 1 and the density value included in image 2 (step S14) includes the process for changing the conversion function when there is a change beyond the prescribed limit range in the conversion function (density value conversion table 22).

The other processing and configuration are the same as those of the first to fifth embodiments, and thus, detailed description about the common parts will not be repeated.

According to the present embodiment, even when generation of the conversion function (density value conversion table) is failed for some reason, correction into the conversion function suitable for density value correction (color correction) can be made.

L. Sixth Embodiment

When a dynamic range of input image 1 is different from a dynamic range of input image 2, it is necessary to correct the difference. Thus, a process for subsequently correcting the conversion function (density value conversion table) when color saturation and the like occur will be described as a sixth embodiment.

Figure 25:
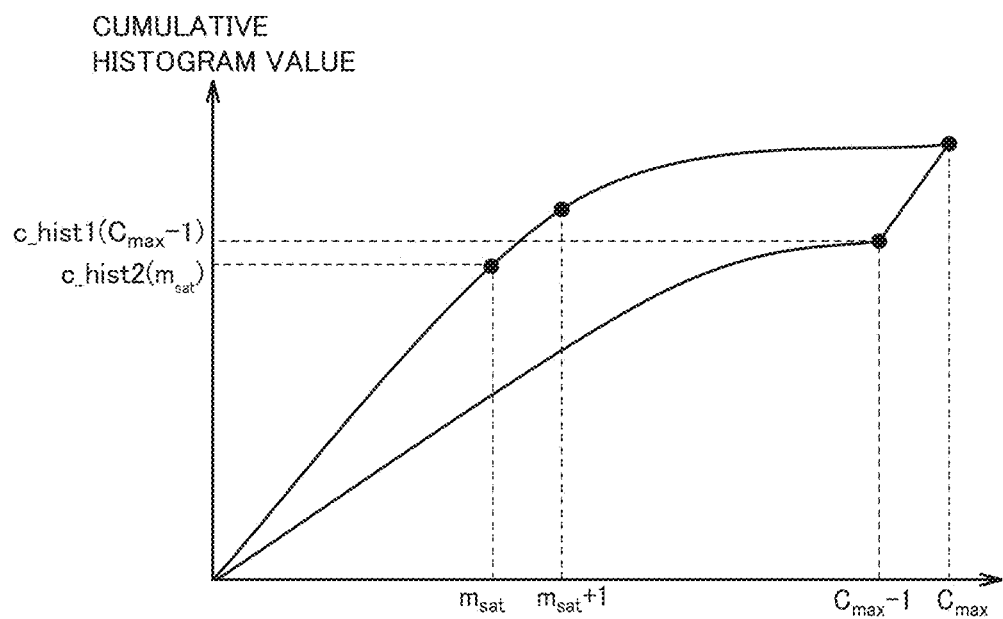
FIG. 25 is a diagram for describing a process for correcting a density value conversion table in a sixth embodiment of the present invention.

FIG. 25 is a diagram for describing a process for correcting the density value conversion table according to the sixth embodiment of the present invention.

It is assumed, for example, that a dynamic range of image 1 is narrower than a dynamic range of image 2 (the number of tones in the density value of image 1 is smaller than the number of tones in the density value of image 2). At this time, if density value conversion is made to match the density value of image 1 to the density value of image 2, a false texture may be generated in an area having color gradation, because the number of tones in the density value is small. In particular, color correction may be made such that the tone stands out around an area where image 1 is color-saturated to form a blown-out highlight.

In order to prevent the aforementioned problem, in the present embodiment, the logic for detecting a color-saturated part to determine whether occurrence of color saturation (so-called "blown-out highlight") is seen or not in the cumulative histogram generated from each of image 1 and image 2. If occurrence of color saturation is detected, density value conversion is made by using the density value at the color saturation as the upper limit value.

As a criterion for determining occurrence of color saturation, a saturation reference value of image 1 is set, for example, to be $satth1 = c\_hist_1(Cmax) \times 0.95$.

When normalized histogram frequency $c\_hist_1(Cmax-1) < satth1$ in the cumulative histogram of image 1, it is determined that image 1 is color-saturated. When it is determined that image 1 is color-saturated, the largest msat that satisfies $c\_hist_1(Cmax-1) > c\_hist_2(m)$ is then searched within the range of the density value $0 \leq m \leq Cmax$ in the cumulative histogram of image 2. The density value (Cmax-1) of image 1 corresponds to density value m of image 2. The value of the density value conversion table is linearly converted such that density value m of image 2 becomes density value Cmax. On the other hand, when conv'(n)>Cmax, the value of the density value conversion table is clipped to Cmax. Namely, density value conv(n) is corrected in accordance with equation (26):

$$conv'(n) = \frac{C_{max}}{m_{sat}} conv(n). \qquad (26)$$

By executing the aforementioned process on the respective channels, the degree of blown-out highlight in image 1 can be matched with the degree of blown-out highlight in image 2.

Conversely, when a blown-out highlight is formed only in image 2, correction is made to image 1. When blown-out highlights are formed in both image 1 and image 2, correction is made to match with the image having a narrower dynamic range.

In the case of a blocked-up shadow as well, occurrence thereof can be detected and the correction value conversion table can be corrected by using the method similar to the above.

As described above, in the present embodiment, the process for determining the correspondence relation between the density value included in image 1 and the density value included in image 2 (step S14) includes the process for changing the conversion function (density value conversion table 22) when occurrence of color saturation is detected in at least one of the histogram of image 1 and the histogram of image 2.

The other processing and configuration are the same as those of the first to sixth embodiments, and thus, detailed description about the common parts will not be repeated.

According to the present embodiment, even when color saturation occurs in the conversion function (density value conversion table) for some reason, correction into the conversion function suitable for density value correction (color correction) can be made.

M. Seventh Embodiment

In the method described in the aforementioned first to sixth embodiments, the case of generating the conversion function (density value conversion table) by using the whole of the input image is mainly assumed. However, the representations of the subject are not precisely identical among the images captured from different points of view. Therefore, depending on an amount of parallax generated between the images, it may be preferable to generate the conversion function (density value conversion table) by using a partial area set in each input image. Thus, a process for generating a conversion function (density value conversion table) by using a cumulative histogram generated from a partial area set in each of a plurality of images will be described as a seventh embodiment. Namely, a common area is specified between image 1 and image 2, and density value correction (color correction) between the images is made.

Namely, in the present embodiment, the process for generating the cumulative histogram from the simple histogram of the density values (steps S8 and S10) includes the process for generating the cumulative histogram from the partial area set in each of image 1 and image 2.

Figure 26:
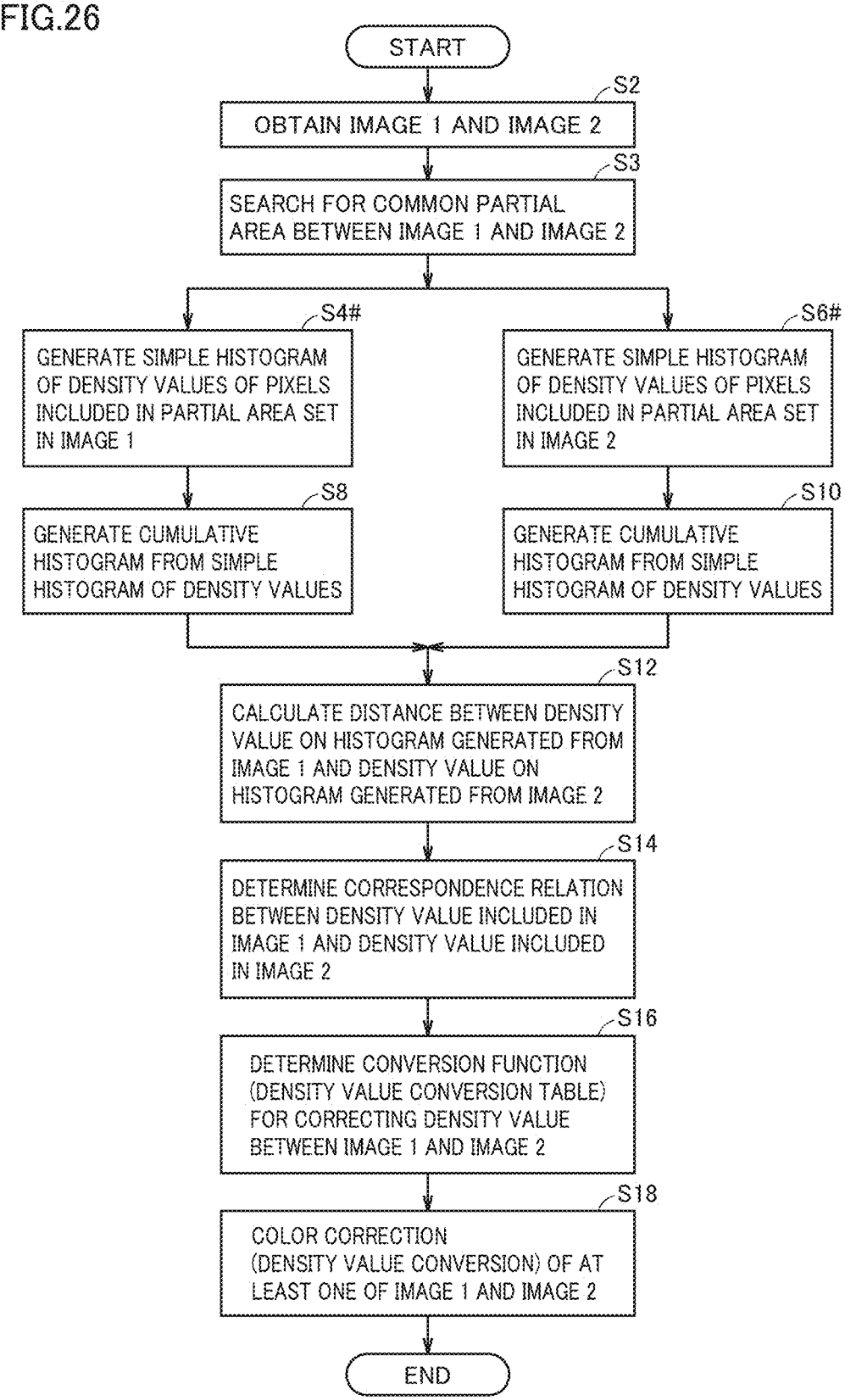
FIG. 26 is a flowchart showing an overall procedure of a conversion function generating process according to a seventh embodiment of the present invention.

More specifically, an overall procedure of the image processing method according to the present embodiment is as shown in FIG. 26. FIG. 26 is a flowchart showing an overall procedure of a conversion function generating process according to the seventh embodiment of the present invention. The flowchart shown in FIG. 26 is different from the flowchart shown in FIG. 9 in that step S3 is newly added and steps S4# and S6# are different from steps S4 and S6 in FIG. 9 in terms of the area used to generate the histogram. The same reference characters are assigned to the steps in which the same processing as the steps shown in FIG. 9 is executed, of the steps shown in FIG. 26. Each step shown in FIG. 26 is typically implemented by CPU 102 (FIG. 2) executing image processing program 112.

Referring to FIG. 26, after at least two images are obtained (after step S2 is executed), CPU 102 searches for a common partial area between image 1 and image 2 (step S3). This process for searching for the partial area will be described below. Image 1 and image 2 are typically captured by using the stereo cameras and these images include the same object. The partial area of image 1 and the partial area of image 2 are set based on the degree of matching between the partial areas.

Next, CPU 102 generates a cumulative histogram of density values of pixels included in the common area set in each image. Namely, CPU 102 generates a simple histogram of density values of pixels included in the partial area set in input image 1 (step S4#), and generates a simple histogram of density values of pixels included in the partial area set in input image 2 (step S6#). The processing in steps S4# and S6# may be implemented by parallel processing or serial processing. When the processing in steps S4# and S6# is implemented by serial processing, the order of execution does not matter. Next, CPU 102 generates a cumulative histogram from the simple histogram of the density values generated in step S4# (step S8), and generates a cumulative histogram from the simple histogram of the density values generated in step S6# (step S10). Thereafter, the same processing as step S12 and the subsequent steps in FIG. 9 is executed.

Hereinafter, a method for searching for and setting the common partial area in step S3 will be described. As a typical method, a method using pattern matching and a method using stereo calibration will be illustrated by way of example.

(1) Pattern Matching

In the process for searching for and setting the common area by using pattern matching, the partial areas are sequentially set in image 1 and image 2, and the degree of matching (degree of similarity) is evaluated between the set partial areas. Then, the partial areas having the largest degree of matching are set as the common area. Namely, using pattern matching, a search is made for the position where a pixel of interest fits most. As described above, the common area corresponds to a range in which a common portion of the same subject is seen. In principle, the partial area corresponding to the common area set in image 1 substantially matches with the partial area corresponding to the common area set in image 2.

This degree of matching $R_{NCC}$ can be calculated by using, for example, a correlation value like equation (27):

$$R_{NCC} = \frac{\sum_{j=0}^{N-1} \sum_{i=0}^{M-1} I(i,j) T(i,j)}{\sqrt{\sum_{j=0}^{N-1} \sum_{i=0}^{M-1} I(i,j)^2 \times \sum_{j=0}^{N-1} \sum_{i=0}^{M-1} T(i,j)^2}}. \quad (27)$$

In equation (27), it is assumed that the pixel size of the partial area is N pixels×M pixels. Using pattern matching, a search is made for the position where degree of matching $R_{NCC}$ calculated in accordance with equation (27) is the largest.

Figure 27:
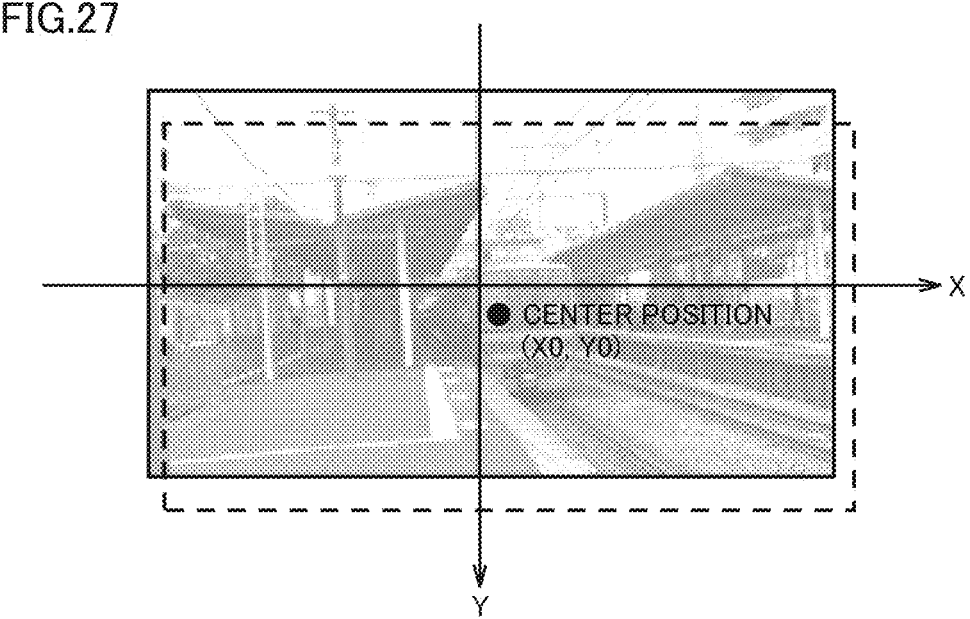
FIG. 27 is a diagram for describing a process for searching for a common area by using pattern matching in the seventh embodiment of the present invention.
Figure 28:
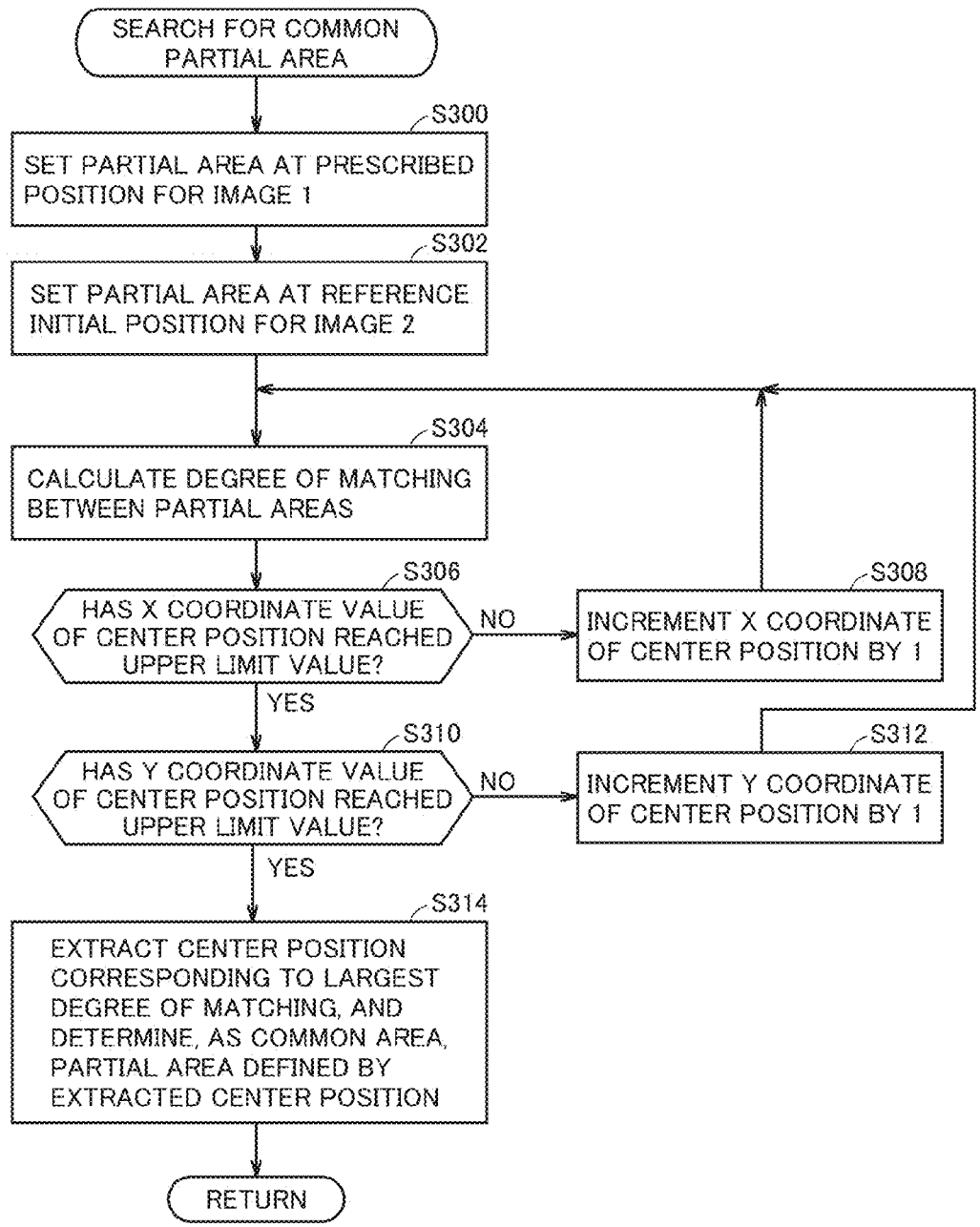
FIG. 28 is a flowchart showing a process procedure for searching for a common area by using pattern matching in the seventh embodiment of the present invention.

FIG. 27 is a diagram for describing the process for searching for the common area by using pattern matching in the seventh embodiment of the present invention. FIG. 28 is a flowchart showing a process procedure for searching for the common area by using pattern matching in the seventh embodiment of the present invention. FIG. 29 is a diagram showing one example of the common area set by using pattern matching in the seventh embodiment of the present invention.

As shown in FIG. 27, in the present embodiment, the partial area is sequentially set in each of image 1 and image 2. For convenience of calculation, the position where the partial area is set is defined by using a center position (X0, Y0). Then, the position of the center position (X0, Y0) is sequentially changed, with the size of the partial area fixed, and degree of matching $R_{NCC}$ is calculated every time the change is made.

The specific process procedure will be described with reference to FIG. 28. FIG. 28 shows an example of a process for setting the partial area in image 1 and sequentially moving the partial area set in image 2. Each step shown in FIG. 28 is typically implemented by CPU 102 (FIG. 2) executing image processing program 112.

First, CPU 102 sets the partial area at a prescribed position for image 1 (step S300). Next, CPU 102 sets the partial area at a reference initial position for image 2 (step S302). Then, CPU 102 calculates the degree of matching between the partial areas currently set in image 1 and image 2 (step S304). This degree of matching may be calculated in accordance with equation (27) above. This calculated degree of matching is primarily stored in the storage area, together with the corresponding center position.

Next, CPU 102 determines whether an X coordinate value of the center position defining the partial area set in image 2 has reached the upper limit value or not (step S306). If the X coordinate value of the center position has not yet reached the upper limit value (NO in step S306), CPU 102 increments the X coordinate of the center position by 1 (step S308) and the processing in step S304 and the subsequent steps is repeated.

If the X coordinate value of the center position has reached the upper limit value (YES in step S306), CPU 102 determines whether a Y coordinate value of the center position defining the partial area set in image 2 has reached the upper limit value or not (step S310).

If the Y coordinate value of the center position has not yet reached the upper limit value (NO in step S310), CPU 102 resets the X coordinate of the center position to an initial value, and increments the Y coordinate of the center position by 1 (step S312) and the processing in step S304 and the subsequent steps is repeated.

If the Y coordinate value of the center position has reached the upper limit value (YES in step S310), CPU 102 extracts a center position corresponding to the largest degree of matching, of the previously-stored degrees of matching, and determines, as a common area, a partial area defined by the extracted center position (step S314). Then, the process ends.

By executing the aforementioned process, the partial area having the largest degree of matching is searched and the common area shown in FIG. 29 can be set in each image.

According to the present embodiment, the density value conversion table is generated by using the image in the common area captured from the same subject, and thus, more appropriate color correction (density value conversion) can be made. Color correction (density value conversion) may be made to the whole of the input image by using the density value conversion table generated from the common area (partial area).

(2) Stereo Calibration

Instead of pattern matching described above, stereo calibration for making optical correction may be used. Specifically, when image 1 and image 2 are obtained by using the stereo cameras, for example, the processing such as correction of distortion in image 1 and image 2 and parallelizing may be executed, and camera calibration may be performed by using a pinhole camera model and the like, to set a common area.

(3) Exclusion of Occlusion Area

When the stereo cameras are used to capture images of a subject from different points of view, a parallax is present between the images. Therefore, due to occlusion, there may be an area where a corresponding image portion between the images is not present. In this case, it is preferable to specify an occlusion area by using corresponding point search such as pattern matching, exclude the specified occlusion area, and create a density value conversion table and the like.

FIG. 30 is a diagram for describing a process for excluding the occlusion area according to the seventh embodiment of the present invention. For example, referring to FIG. 30, in input image 1 and image 2, a part of a subject (standing tree) on the rear side is not seen due to a subject (person) on the front side. In such a case, corresponding point search is first conducted between image 1 and image 2 to determine a correspondence relation. Then, an area that is not seen in image 2 (occlusion area indicated by black in FIG. 30) is removed for image 1, and similarly, an area that is not seen in image 1 (occlusion area indicated by black in FIG. 30) is removed for image 2. The lower part of FIG. 30 shows a pair of images after exclusion of the occlusion areas ("after removal"). Namely, the partial area of image 1 and the partial area of image 2 are set to exclude the occlusion areas.

Then, various types of processing described above are executed between the pair of images after exclusion of the occlusion areas.

Since the occlusion areas are removed as described above, higher accuracy of corresponding point search (pattern matching) can be achieved and more appropriate density value conversion table can be generated.

The other processing and configuration are the same as those of the first to seventh embodiments, and thus, detailed description about the common parts will not be repeated.

N. Advantages

According to the present embodiment, a conversion function for correcting a density value can be generated more appropriately even when representations of a subject are different among a plurality of images.

O. Another Mode

The following configuration is included as an embodiment of the present invention.

An image processing method according to another aspect of the present invention has: a histogram generating step of generating a cumulative histogram of density values from each of two or more images; a distance calculating step of calculating a distance between the density values in a space defined by a histogram frequency and the density value; and a correspondence relation determining step of determining a correspondence relation between the density values of the images based on the calculated distance between the density values and generating a density value conversion table.

Preferably, in the correspondence relation determining step, a magnitude relation of the density values of the images is stored and the correspondence relation is determined.

Preferably, in the correspondence relation determining step, the correspondence relation between the density values is determined such that a sum of distances between the density values of the images is the smallest.

Preferably, in the distance calculating step, weight is set in the axial direction of a space and the distance is calculated.

More preferably, in the distance calculating step, the weight is set based on the histogram frequency.

More preferably, in the distance calculating step, the weight is set based on the density value.

Preferably, in the correspondence relation determining step, a density value range subjected to distance calculation is limited and the correspondence is determined.

More preferably, in the correspondence relation determining step, a histogram in the limited density value range is modified and the correspondence is determined.

Preferably, in the correspondence relation determining step, the histogram is moved in parallel, and then, the correspondence relation is determined.

Preferably, the image processing method further includes a table correcting step of detecting a change equal to or larger than a threshold value or a change equal to or smaller than the threshold value about the density value conversion table, and correcting the density value conversion table.

Preferably, the image processing method further includes a dynamic range adjusting step of detecting presence or absence of color saturation from the histogram frequency and correcting the density value conversion table.

Preferably, a series of processing is executed for each density value of each channel.

Preferably, in the histogram generating step, the histogram is generated from a partial area of the image.

More preferably, the image refers to an image including the same object as that in at least one other image, and the partial area refers to a common area between the images.

More preferably, the image refers to an image including the same object as that in at least one other image, and the partial area refers to an area after exclusion of an occlusion area between the images.

More preferably, a process for specifying the common area is pattern matching or stereo calibration.

More preferably, a process for specifying the occlusion area is corresponding point search (pattern matching).

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

REFERENCE SIGNS LIST 2, 4 camera; 10 image managing unit; 12 data storing unit; 14 histogram generating unit; 16 determining unit; 18 distance calculating unit; 22 density value conversion table; 24 density value converting unit; 100, 200 image processing apparatus; 102 CPU; 104 RAM; 106 ROM; 108 network interface; 110 auxiliary storage device; 112 image processing program; 114 image to be processed; 120, 206 display unit; 122, 204 input unit; 124 memory card interface; 126 memory card; 130 bus; 202 image processing engine; 212, 222 lens; 214, 224 image sensor.

The invention claimed is:

1. An image processing method, comprising:
generating a cumulative histogram of density values of pixels included in at least each of a first image and a second image;
calculating a distance between a first density value on a first histogram generated from said first image and a second density value on a second histogram generated from said second image, in a space defined to include histogram frequencies and density values with respect to said first and second histograms, wherein said calculating comprises setting weight in accordance with an axial distance corresponding to a histogram frequency in said space, when calculating said distance;
determining a correspondence relation between said first density value included in said first image and said second density value included in said second image based on said calculated distance between said first and second density values, and
determining a conversion function for correcting a third density value in said first image based on said determined correspondence relation, wherein said determining said correspondence relation comprises determining said correspondence relation between said first and second density values such that a sum of distances between all density values included in said first image and corresponding density values included in said second image is minimized.

2. An image processing method, comprising:
generating a cumulative histogram of density values of pixels included in at least each of a first image and a second image;
calculating a distance between a first density value on a first histogram generated from said first image and a second density value on a second histogram generated from said second image, in a space defined to include histogram frequencies and density values with respect to said first and second histograms, wherein said calculating comprises setting weight in accordance with an axial distance corresponding to a density value in said space, when calculating said distance;
determining a correspondence relation between said first density value included in said first image and said second density value included in said second image based on said calculated distance between said first and second density values, and
determining a conversion function for correcting a third density value in said first image based on said determined correspondence relation, wherein said determining said correspondence relation comprises determining said correspondence relation between said first and second density values such that a sum of distances between all density values included in said first image and corresponding density values included in said second image is minimized.

3. An image processing method, comprising:
generating a cumulative histogram of density values of pixels included in at least each of a first image and a second image;
calculating a distance between a first density value on a first histogram generated from said first image and a second density value on a second histogram generated from said second image, in a space defined to include histogram frequencies and density values with respect to said first and second histograms, wherein said calculating comprises calculating said distance with at least one of said first histogram and said second histogram moved in parallel to a first axial component corresponding to said histogram frequencies and/or a second axial component corresponding to fourth density values in said space;
determining a correspondence relation between said first density value included in said first image and said second density value included in said second image based on said calculated distance between said first and second density values, and
determining a conversion function for correcting a third density value in said first image based on said determined correspondence relation, wherein said determining said correspondence relation comprises determining said correspondence relation between said first and second density values such that a sum of distances between all density values included in said first image and corresponding density in said second image is minimized.

4. An image processing method, comprising:
generating a cumulative histogram of density values of pixels included in at least each of a first image and a second image;
calculating a distance between a first density value on a first histogram generated from said first image and a second density value on a second histogram generated from said second image, in a space defined to include histogram frequencies density values with respect to said first and second histograms;

determining a correspondence relation between said first density value included in said first image and said second density value included in said second image based on said calculated distance between said first and second density values, and determining a conversion function for correcting a third density value in said first image based on said determined correspondence relation, wherein said determining said correspondence relation comprises determining said correspondence relation between said first and second density values such that a sum of distances between all density values included in said first image and corresponding density values included in said second image is minimized, wherein said determining comprises changing said conversion function when there is a change beyond a prescribed limit range in said conversion function.

5. An image processing method, comprising:

generating a cumulative histogram of density values of pixels included in at least each of a first image and a second image;

calculating a distance between a first density value on a first histogram generated from said first image and a second density value on a second histogram generated from said second image, in a space defined to include histogram frequencies and density values with resect to said first and second histograms;

determining a correspondence relation between said first density value included in said first image and said second density value included in said second image based on said calculated distance between said first and second density values, and determining a conversion function for correcting a third density value in said first image based on said determined correspondence relation, wherein said determining said correspondence relation comprises determining said correspondence relation between said first and second density values such that a sum of distances between all density values included in said first image and corresponding density values included in said second image is minimized, wherein said determining comprises changing said conversion function when occurrence of color saturation is detected in at least one of said first histogram and said second histogram.

6. An image processing apparatus, comprising:

a processing unit;

a memory device in communication with said processing unit, wherein said memory device is storing an image processing program, wherein when said image processing program is executed by said processing unit the following acts are performed:

generating a cumulative histogram of density values of pixels included in at least each of a first image and a second image;

calculating a distance between a first density value on a first histogram generated from said first image and a second density value on a second histogram generated from said second image, in a space defined to include histogram frequencies and density values with respect to said first and second histograms, wherein said calculating comprises setting a weight in accordance with an axial distance corresponding to a histogram frequency in said space, when calculating said distance; and determining a correspondence relation between said first density value included in said first image and said second the density value included in said second image based on said calculated distance between said first and second density values, and determining a conversion function for correcting a third density value in said first image based on said determined correspondence relation, wherein said determining said correspondence relation comprises determining said correspondence relation between said first and second density values such that a sum of distances between all density values included in said first image and corresponding density values included in said second image is minimized.

7. An image processing apparatus, comprising:

a processing unit;

a memory device in communication with said processing unit, wherein said memory device is storing an image processing program, wherein when said image processing program is executed by said processing unit the following acts are performed:

generating a cumulative histogram of density values of pixels included in at least each of a first image and a second image;

calculating a distance between a first density value on a first histogram generated from said first image and a second density value on a second histogram generated from said second image, in a space defined to include histogram frequencies and density values with respect to said first and second histograms, wherein said calculating comprises setting a weight in accordance with an axial distance corresponding to a density value in said space, when calculating said distance; and determining a correspondence relation between said first density value included in said first image and said second the density value included in said second image based on said calculated distance between said first and second density values, and determining a conversion function for correcting a third density value in said first image based on said determined correspondence relation wherein said determining said correspondence relation comprises determining said correspondence relation between said first and second density values such that a sum of distances between all density values included in said first image and corresponding density values included in said second image is minimized.

8. An image processing apparatus, comprising:

a processing unit;

a memory device in communication with said processing unit, wherein said memory device is storing an image processing program, wherein when said image processing program is executed by said processing unit the following acts are performed:

generating a cumulative histogram of density values of pixels included in at least each of a first image and a second image;

calculating a distance between a first density value on a first histogram generated from said first image and a second density value on a second histogram generated from said second image, in a space defined to include histogram frequencies and density values with respect to said first and second histograms, wherein said calculating comprises calculating said distance with at least one of said first histogram and said second histogram moved in parallel to a first axial component corresponding to said histogram frequencies and/or a second axial component corresponding to fourth density values in said space; and
determining a correspondence relation between said first density value included in said first image and said second the density value included in said second image based on said calculated distance between said first and second density values, and determining a conversion function for correcting a third density value in said first image based on said determined correspondence relation, wherein said determining said correspondence relation comprises determining said correspondence relation between said first and second density values such that a sum of distances between all density values included in said first image and corresponding density values included in said second image is minimized.

* * * * *